United States Patent
Sriskandha et al.

(10) Patent No.: US 11,884,763 B2
(45) Date of Patent: Jan. 30, 2024

(54) SPHERICAL PARTICLES COMPRISING CARBON NANOMATERIAL-GRAFT-POLYOLEFIN AND METHODS OF PRODUCTION AND USES THEREOF

(71) Applicant: Xerox Corporation, Norwalk, CT (US)

(72) Inventors: Shivanthi Easwari Sriskandha, Mississauga (CA); Valerie M. Farrugia, Oakville (CA)

(73) Assignee: Xerox Corporation, Norwalk, CT (US)

( * ) Notice: Subject to any disclaimer, the term of this patent is extended or adjusted under 35 U.S.C. 154(b) by 94 days.

(21) Appl. No.: 17/321,759

(22) Filed: May 17, 2021

(65) Prior Publication Data
US 2022/0363799 A1    Nov. 17, 2022

(51) Int. Cl.
| | |
|---|---|
| C08F 2/46 | (2006.01) |
| C08F 2/50 | (2006.01) |
| C08G 61/04 | (2006.01) |
| C08F 292/00 | (2006.01) |
| B33Y 70/00 | (2020.01) |
| C08L 51/10 | (2006.01) |
| B82Y 30/00 | (2011.01) |
| C08K 3/04 | (2006.01) |
| B29K 96/02 | (2006.01) |
| B29K 101/12 | (2006.01) |
| B29K 507/04 | (2006.01) |

(52) U.S. Cl.
CPC ............ *C08F 292/00* (2013.01); *B33Y 70/00* (2014.12); *B82Y 30/00* (2013.01); *C08K 3/04* (2013.01); *C08L 51/10* (2013.01); *B29K 2096/02* (2013.01); *B29K 2101/12* (2013.01); *B29K 2507/04* (2013.01); *C08K 2201/011* (2013.01); *Y10S 977/742* (2013.01)

(58) Field of Classification Search
CPC ....... B82Y 30/00; C01B 32/21; C01B 32/156; C01B 32/198; C01B 32/174; C01B 32/194; B33Y 10/00; B33Y 40/10; B33Y 70/00; Y10S 977/42; C01P 2004/60; C08F 2/44; C08F 2/06; C08F 292/00; C08F 110/02; C08K 3/04; C08K 3/041; C08K 2201/011; B29C 64/314; B29K 2101/12; B29K 2507/04; B29K 2096/02
USPC .......................................... 522/109, 1; 520/1
See application file for complete search history.

(56) References Cited

FOREIGN PATENT DOCUMENTS

| | | | |
|---|---|---|---|
| CN | 103319724 | A | 9/2013 |
| CN | 103980609 | A | 8/2014 |
| CN | 105315456 | A | 2/2016 |
| CN | 106633373 | * | 5/2017 |
| CN | 106633373 | A | 5/2017 |
| EP | 3760412 | A1 | 1/2021 |
| JP | 2020002247 | A | 1/2020 |

OTHER PUBLICATIONS

Yan et al, CN 106633373 Machine Translation, May 10, 2017 (Year: 2017).*
Extended European Search Report from corresponding EP application No. 22171507.1 dated Nov. 7, 2022.
Yang, B.-X., Pramoda, K., Xu, G. and Goh, S. (2007), Mechanical Reinforcement of Polyethylene Using Polyethylene-Grafted Multiwalled Carbon Nanotubes. Adv. Funct. Mater., 17: 2062-2069.
Akbar, S., Beyou, E., Chaumont, P., Mazzolini, J., Espinosa, E., D'agosto, F. and Boisson, C. (2011), Synthesis of polyethylene-grafted multiwalled carbon nanotubes via a peroxide-initiating radical coupling reaction and by using well-defined TEMPO and thiol end-functionalized polyethylenes. J. Polym. Sci. A Polym. Chem., 49: 957-965.
Redzic, E., Garoff, T., Mardare, C.C. et al. Heterogeneous Ziegler-Natta catalysts with various sizes of MgCl2 crystallites: synthesis and characterization. Iran Polym J 25, 321-337 (2016).
Extended European Search Report for corresponding EP Application No. 22170385.3 dated Oct. 17, 2022.
Kausar, A. Polyamide-grafted-multi-walled carbon nanotube electrospun nanofibers/epoxy composites. Fibers Polym 15, 2564-2571 (2014).
Huanmin Li, Xu-Ming Xie. Polyolefin-functionalized graphene oxide and its GO/HDPE nanocomposite with excellent mechanical properties[J]. Chin. Chem. Lett., 2018, 29(1): 161-165.
Hohimer Cameron J et al: "Electrical conductivity and piezoresistive response of 3D printed thermoplastic polyurethane/multiwalled carbon nanotube composites", Proceedings of SPIE; [Proceedings of SPIE SSN 0277-786X vol. 10524], SPIE, US, vol. 10596, Mar. 22, 2018 (Mar. 22, 2018), pp. 105960J-105960J, XP060102310, DOI: 10.1117/12.2296774; ISBN: 978-1-5106-1533-5 * Chapters 2.1 and 2.2 *.

* cited by examiner

*Primary Examiner* — Jessica Whiteley
(74) *Attorney, Agent, or Firm* — Vorys, Sater, Seymour and Pease LLP (57) ABSTRACT

A nonlimiting example method of forming highly spherical carbon nanomaterial-graft-polyolefin (CNM-g-polyolefin) particles may comprising: mixing a mixture comprising: (a) a CNM-g-polyolefin comprising a polyolefin grafted to a carbon nanomaterial, (b) a carrier fluid that is immiscible with the polyolefin of the CNM-g-polyolefin, optionally (c) a thermoplastic polymer not grafted to a CNM, and optionally (d) an emulsion stabilizer at a temperature greater than a melting point or softening temperature of the polyolefin of the CNM-g-polyolefin and the thermoplastic polymer, when included, and at a shear rate sufficiently high to disperse the CNM-g-polyolefin in the carrier fluid; cooling the mixture to below the melting point or softening temperature to form the CNM-g-polyolefin particles; and separating the CNM-g-polyolefin particles from the carrier fluid.

17 Claims, 1 Drawing Sheet

SPHERICAL PARTICLES COMPRISING CARBON NANOMATERIAL-GRAFT-POLYOLEFIN AND METHODS OF PRODUCTION AND USES THEREOF

TECHNICAL FIELD

The present disclosure relates to highly spherical particles that comprises carbon nanomaterial-graft-polyolefin (CNM-g-polyolefin). The present disclosure further relates to compositions, synthesis methods, and applications of such particles (also referred to herein as CNM-g-polyolefin particles).

BACKGROUND

Thermoplastic polymers are often used to make extruded objects like films, bags, particles, and filaments. Many thermoplastic polymers are have the ability to withstand elevated temperatures and/or low temperatures without loss of physical properties. Therefore, objects formed with thermoplastic polymers can be used in demanding applications like power tools, automotive parts, gears, and appliance parts.

Polyolefins, such as polyethylene and polypropylene, are one of the largest classes of commercial polymers due to their versatile properties, easily tailored microstructure, and relatively low cost. One method of tailoring the physical properties of and/or imparting new properties to the polyolefins is to incorporate fillers. For example, carbon nanomaterials like carbon nanotubes and graphene have been used to improve the mechanical, thermal, and electrical properties of polyolefins. Said polyolefin-carbon nanomaterial composites have been used in traditional methods like extrusion for producing a variety of objects. Expanding the methods by which polyolefin-carbon nanomaterial composites can be manufactured into objects would further expand the polymer composite industry.

SUMMARY

The present disclosure relates to highly spherical particles that comprises a CNM-g-polyolefin. The present disclosure further relates to compositions, synthesis methods, and applications of such particles.

Disclosed herein are methods of selective laser sintering that comprise: depositing carbon nanomaterial-graft-polyolefin (CNM-g-polyolefin) particles optionally in combination with other thermoplastic polymer particles onto a surface, wherein the CNM-g-polyolefin particles comprise: a polyolefin grafted to a carbon nanomaterial; and once deposited, exposing at least a portion of the CNM-g-polyolefin particles to a laser to fuse the polymer particles thereof and form a consolidated body by selective laser sintering.

Disclosed herein are methods that comprise: mixing a mixture comprising: (a) a CNM-g-polyolefin comprising: a polyolefin grafted to a carbon nanomaterial, (b) a carrier fluid that is immiscible with the polyolefin of the CNM-g-polyolefin, optionally (c) a thermoplastic polymer not grafted to a CNM, and optionally (d) an emulsion stabilizer at a temperature greater than a melting point or softening temperature of the polyolefin of the CNM-g-polyolefin and the thermoplastic polymer, when included, and at a shear rate sufficiently high to disperse the CNM-g-polyolefin in the carrier fluid; cooling the mixture to below the melting point or softening temperature to form CNM-g-polyolefin particles; and separating the CNM-g-polyolefin particles from the carrier fluid.

BRIEF DESCRIPTION OF THE DRAWINGS

The following FIGURES are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
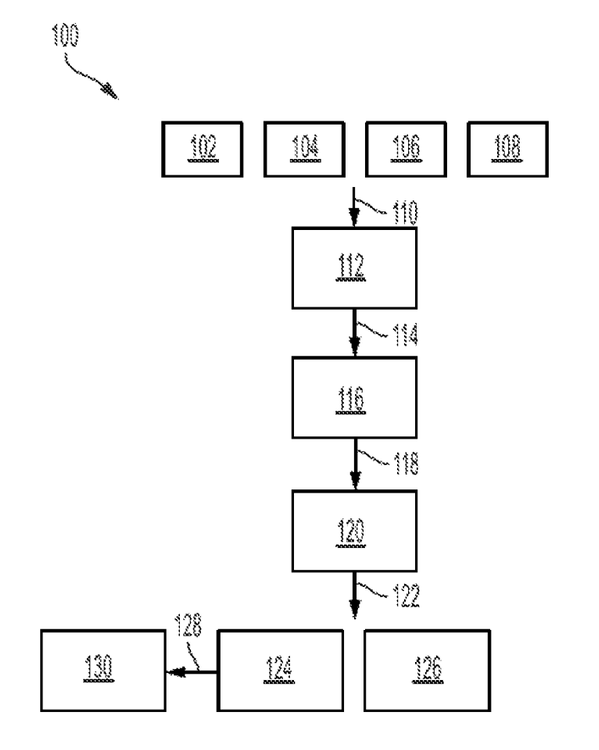
The FIGURE illustrates a flow chart of a nonlimiting example method of the present disclosure.

Three-dimensional (3-D) printing, also known as additive manufacturing, is a rapidly growing technology area. Although 3-D printing has traditionally been used for rapid prototyping activities, this technique is being increasingly employed for producing commercial and industrial objects, which may have entirely different structural and mechanical tolerances than do rapid prototypes.

3-D printing operates by depositing either (a) small droplets or streams of a melted or solidifiable material or (b) powder particulates in precise deposition locations for subsequent consolidation into a larger object, which may have any number of complex shapes. Such deposition and consolidation processes typically occur under the control of a computer to afford layer-by-layer buildup of the larger object. In a particular example, consolidation of powder particulates may take place in a 3-D printing system using a laser to promote selective laser sintering (SLS).

Powder particulates usable in 3-D printing include thermoplastic polymers, including thermoplastic elastomers, metals, and other solidifiable substances. When using a composites in 3-D printing, the particulates (e.g., the carbon nanomaterial of a polyolefin-carbon nanomaterial composites) should be evenly dispersed throughout the small melted droplets or the powder particulate, or the distribution of the particulates of the final object will be uneven. Accordingly, the properties (e.g., strength and/or electrical conductivity) of the object may also be irregular, which may introduce points of failure to the object.

The present disclosure relates to highly spherical particles that comprises carbon nanomaterial-graft-polyolefin (CNM-g-polyolefin). The CNM-g-polyolefin particles may be useful, among other things, as starting material for additive manufacturing, especially SLS 3-D printing. The carbon nanomaterials may improve the physical properties and/or impart new physical properties to the object produced by additive manufacturing. Further, by using CNM-g-polyolefin, the carbon nanomaterials may be well dispersed and/or distributed through in the polymer particles. Therefore, the carbon nanomaterials may be well dispersed and/or distributed through the object (or portion thereof) that is produced by additive manufacturing.

Definitions and Test Methods

As used herein, the term "catalyst" refers to a compound that, when used at very low concentration in a reaction medium, allows the rate of a reaction (e.g., a polymerization reaction) to be increased via interaction with the reagents, without, however, being chemically altered at the end of the reaction.

As used herein, the term "cocatalyst" refers to a compound capable of acting synergistically with the catalyst to increase the rate of a reaction (e.g., a polymerization reaction).

As used herein, the term "immiscible" refers to a mixture of components that, when combined, form two or more phases that have less than 5 wt % solubility in each other at ambient pressure and at room temperature or the melting point of the component if it is solid at room temperature. For example, polyethylene oxide having 10,000 g/mol molecular weight is a solid room temperature and has a melting point of 65° C. Therefore, said polyethylene oxide is immiscible with a material that is liquid at room temperature if said material and said polyethylene oxide have less than 5 wt % solubility in each other at 65° C.

As used herein, the term "thermoplastic polymer" refers to a plastic polymer material that softens and hardens reversibly on heating and cooling. Thermoplastic polymers encompass thermoplastic elastomers.

As used herein, the term "elastomer" refers to a copolymer comprising a crystalline "hard" section and an amorphous "soft" section. In the case of a polyurethane, the crystalline section may include a portion of the polyurethane comprising the urethane functionality and optional chain extender group, and the soft section may include the polyol, for instance.

As used herein, the term "polyurethane" refers to a polymeric reaction product between a diisocyanate, a polyol, and an optional chain extender.

As used herein, the term "oxide" refers to both metal oxides and non-metal oxides. For purposes of the present disclosure, silicon is considered to be a metal.

As used herein, the terms "carbon nanomaterial-graft-polyolefin" and "CNM-g-polyolefin" refer to a carbon nanomaterial as a central or backbone structure having a polyolefin extending therefrom. These terms do not imply the method by which the structure is produced but rather describe the structure itself.

As used herein, the term "carbon nanomaterial" refers to molecules or particles having at least one dimension being 50 nm or less where the core structure of the particle is composed of at least 50 atomic % carbon. Examples of carbon nanomaterials include, but are not limited to, fullerenes, carbon nanotubes, graphite, graphene, and any combinations thereof.

As used herein, the term "fullerene" refers to particles or molecules having a cage as the core structure and the cage structure having an aspect ratio of 10 or less. As used herein, the term "carbon nanotube" refers to particles or molecules having an elongated, cylindrical structure as the core structure and the elongated, cylindrical structure having an aspect ratio of more than 10. As used herein, the term "carbon nanotube" encompasses single-walled carbon nanotube (i.e., having one wall), double-walled carbon nanotube (i.e., having two walls), and multi-walled carbon nanotube (i.e., having two or more walls). As used herein, the term "graphene" refers to particles or molecules having a planar graphitic structure and encompasses single-layer graphene to three-layer graphene. As used herein, the term "graphite" refers to particles or molecules having more than three layers planar graphite.

The terms "carbon nanomaterial," "fullerene," "carbon nanotubes," "graphite," and "graphene" encompass functionalized versions thereof.

As used herein, the term "embed" relative to particles (e.g., nanoparticles) and a surface of a polymer particle refers to the particle being at least partially extending into the surface of the polymer particle such that polymer is in contact with the nanoparticle to a greater degree than would be if the nanoparticle were simply laid on the surface of the polymer particle.

Herein, D10, D50, D90, and diameter span are primarily used herein to describe particle sizes. As used herein, the term "D10" refers to a diameter below which 10% (on a volume-based distribution, unless otherwise specified) of the particle population is found. As used herein, the terms "D50", "average particle diameter," and "average particle size" refers to a diameter below which 50% (on a volume-based median average, unless otherwise specified) of the particle population is found. As used herein, the term "D90" refers to a diameter below which 90% (on a volume-based distribution, unless otherwise specified) of the particle population is found. As used herein, the terms "diameter span" and "span" and "span size" when referring to diameter provides an indication of the breadth of the particle size distribution and is calculated as (D90-D10)/D50.

Particle diameters and particle size distributions are determined by light scattering techniques using a Malvern MASTERSIZER™ 3000. For light scattering techniques, the control samples were glass beads with a diameter within the range of 15 μm to 150 μm under the tradename Quality Audit Standards QAS4002™ obtained from Malvern Analytical Ltd. Samples were analyzed as dry powders, unless otherwise indicated. The particles analyzed were dispersed in air and analyzed using the AERO S™ dry powder dispersion module with the MASTERSIZER™ 3000. The particle sizes were derived using instrument software from a plot of volume density as a function of size.

As used herein, when referring to sieving, pore/screen sizes are described per U.S.A. Standard Sieve (ASTM E11-17).

As used herein, the terms "circularity" relative to the particles refer to how close the particle is to a perfect sphere. To determine circularity, optical microscopy images using flow particle imaging are taken of the particles. The perimeter (P) and area (A) of the particle in the plane of the microscopy image is calculated (e.g., using a SYSMEX FPIA 3000 particle shape and particle size analyzer, available from Malvern Instruments). The circularity of the particle is $C_{EA}/P$, where $C_{EA}$ is the circumference of a circle having the area equivalent to the area (A) of the actual particle. Herein, the circularity is based on three runs through a SYSMEX FPIA 3000 particle shape and particle size analyzer, where 6,000 to 10,000 particles are analyzed per run. The reported circularity is the median average circularity based on particle number. In the analysis, a threshold for distinguishing the greyscale levels between the background pixels and the particle pixels (e.g., to correct for non-uniform illumination conditions) was set at 90% of the background modal value.

As used herein, the term "shear" refers to stirring or a similar process that induces mechanical agitation in a fluid.

As used herein, the term "aspect ratio" refers to length divided by width, wherein the length is greater than the width.

The melting point of a polymer, unless otherwise specified, is determined by ASTM E794-06(2018) with 10° C./min ramping and cooling rates.

The softening temperature or softening point of a polymer, unless otherwise specified, is determined by ASTM D6090-17. The softening temperature can be measured by using a cup and ball apparatus available from Mettler-Toledo using a 0.50 gram sample with a heating rate of 1° C./min.

Angle of repose is a measure of the flowability of a powder. Angle of repose measurements were determined using a Hosokawa Micron Powder Characteristics Tester PT-R using ASTM D6393-14 "Standard Test Method for Bulk Solids" Characterized by Carr Indices."

Aerated density ($\rho$aer) is measured per ASTM D6393-14.
Bulk density ($\rho$bulk) is measured per ASTM D6393-14.
Tapped density ($\rho$tap) is measured per ASTM D6393-14.

Hausner ratio (Hr) is a measure of the flowability of a powder and is calculated by Hr=$\rho$tap/$\rho$bulk, where $\rho$bulk is the bulk density per ASTM D6393-14 and $\rho$tap is the tapped density per ASTM D6393-14.

As used herein, viscosity of carrier fluids are the kinematic viscosity at 25° C., unless otherwise specified, measured per ASTM D445-19. For commercially procured carrier fluids (e.g., polydimethylsiloxane oil), the kinematic viscosity data cited herein was provided by the manufacturer, whether measured according to the foregoing ASTM or another standard measurement technique.

CNM-g-Polyolefin Composites

CNM-g-polyolefin composites comprises one or more polyolefin grafted to one or more CNM. CNM-g-polyolefin composites may comprises a mixture of CNMs each having the same or different polyolefins grafted thereto. CNM-g-polyolefin composites may comprise a single CNM having one or more polyolefins grafted thereto. CNM-g-polyolefin composites may comprise a first CNM having a first polyolefin grafted thereto and a second CNM (the same or different than the first CNM) having a second polyolefin grafted thereto (the same or different than the first polyolefin) where (a) the first and second CNMs are different and/or (b) the first and second polyolefins are different.

Examples of CNM that may have a polyolefin grafted thereto include, but are not limited to, fullerenes, carbon nanotubes (e.g., single walled carbon nanotubes, double walled carbon nanotubes, multiwalled carbon nanotubes, and the like), graphite (e.g., graphite particles, highly-oxidized graphite particles, and the like), graphene (e.g., graphene particle, graphene ribbons, graphene sheets, and the like, and highly-oxidized derivatives thereof), and the like, and any combinations thereof.

Examples of polyolefins that may be grafted to CNM include, but are not limited to, polymers and copolymers derived from one or more $C_2$ to $C_{40}$ olefin monomers.

The CNM-g-polyolefin may comprises about 50 wt % to about 99.95 wt % (or about 55 wt % to about 95 wt %, or about 60 wt % to about 90 wt %, or about 65 wt % to about 85 wt %, or about 70 wt % to about 80 wt %) of the polyolefin, and about 0.05 wt % to about 50 wt % (or about 5 wt % to about 45 wt %, or about 10 wt % to about 40 wt %, or about 15 wt % to about 35 wt %, or about 20 wt % to about 30 wt %, or about 25 wt % to about 50 wt %) of the CNM, based on the total weight of the CNM-g-polyolefin.

The polyolefin may be grafted on surfaces of the carbon nanomaterial by any suitable method including, for example, in-situ polymerization, in-situ free radical functionalization, amidation reaction, and the like.

By way of nonlimiting example, the polyolefin may be grafted on surfaces of the carbon nanomaterial by in-situ polymerization. The in-situ polymerization may be a polymerization filling technique (PFT). The in-situ polymerization may be carried out by pre-treating the carbon nanomaterial, wherein pre-treating comprises: contacting/binding a catalyst, and optionally a cocatalyst, on the surfaces of the carbon nanomaterial, and wherein the catalyst is a heterogeneous catalyst, a homogeneous metallocene catalyst, or a homogeneous non-metallocene catalyst.

The in-situ polymerization may be carried out using Ziegler-Natta catalyst. Alternately, the in-situ polymerization may be carried out using a metallocene catalyst, in the presence of a cocatalyst which may comprise aluminoxane. The aluminoxane may be present at a molar ratio of aluminum to catalyst compound transition metal of 100:1 or more (or about 100:1 to about 500:1, or about 200:1 to 300:1).

The polymerization processes of the present disclosure may comprise monomer (such as propylene), and optionally comonomer, wherein the said momomer/comonomer may be contacted with a catalyst system comprising an activator and at least one catalyst, as described above. The catalyst and activator may be combined in any order, and are combined typically prior to contacting with the monomer.

Monomers useful herein may include substituted or unsubstituted $C_2$ to $C_{40}$ alpha olefins, preferably $C_2$ to $C_{20}$ alpha olefins, preferably $C_2$ to $C_{12}$ alpha olefins, preferably ethylene, propylene, butene, pentene, hexene, heptene, octene, nonene, decene, undecene, dodecene and isomers thereof. The monomer may comprise propylene and an optional comonomers comprising one or more ethylene or $C_4$ to $C_{40}$ olefins, preferably $C_4$ to $C_{20}$ olefins, or preferably $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups.

Further, the monomer may comprise ethylene and an optional comonomers comprising one or more $C_3$ to $C_{40}$ olefins, preferably $C_4$ to $C_{20}$ olefins, or preferably $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups.

Exemplary $C_2$ to $C_{40}$ olefin monomers and optional comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, preferably norbornene, norbornadiene, and dicyclopentadiene.

For example, methods of the present disclosure may comprise polymerizing in-situ the carbon nanomaterial with one or more of: ethylene, propylene, 1-butene, 4-methyl-1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-cyclopentene, cyclohexene, norbornene, ethylidene-norbornene, vinylidene-norbornene, and combinations thereof.

In some cases, little or no aluminoxane is used in the process to produce the polymers. Preferably, aluminoxane is present at zero mol %, alternately the aluminoxane is present at a molar ratio of aluminum to transition metal less than 500:1, such as less than 300:1, such as less than 100:1, such as less than 1:1.

Further, little or no scavenger is used in the process to produce the ethylene polymer. Preferably, scavenger (such as tri alkyl aluminum) is present at zero mol %, alternately the scavenger is present at a molar ratio of scavenger metal to transition metal of less than 100:1, preferably less than 50:1, preferably less than 15:1, preferably less than 10:1.

Methods of the present disclosure may produce olefin polymers, preferably polyethylene and polypropylene homopolymers and copolymers. The polymers produced herein may be homopolymers of ethylene or propylene, may be copolymers of ethylene having from 0 to 25 mole % (alternately from 0.5 to 20 mole %, alternately from 1 to 15 mole %, preferably from 3 to 10 mole %) of one or more $C_3$ to $C_{20}$ olefin comonomer (preferably $C_3$ to $C_{12}$ alpha-olefin, preferably propylene, butene, hexene, octene, decene, dodecene, preferably propylene, butene, hexene, octene), or may be copolymers of propylene preferably having from 0 to 25 mole % (alternately from 0.5 to 20 mole %, alternately from 1 to 15 mole %, preferably from 3 to 10 mole %) of one or more of $C_2$ or $C_4$ to $C_{20}$ olefin comonomer (preferably ethylene or $C_4$ to $C_{12}$ alpha-olefin, preferably ethylene, butene, hexene, octene, decene, dodecene, preferably ethylene, butene, hexene, octene).

The in-situ polymerization may be a metallocene/methylaluminoxane (MAO) catalyzed Polymerization Filling Technique (PFT), wherein the carbon nanomaterial is pre-treated with MAO cocatalyst, followed by homopolymerization the monomer (e.g., ethylene or propylene) in the presence of the pretreated carbon nanomaterial with the MAO as cocatalyst and $Cp_2ZrCl_2$ as the catalyst.

In another nonlimiting example of in-situ polymerization, a Ziegler-Natta catalyst may be used as followed: a graphene oxide-supported Ziegler-Natta catalyst may be formed via Grignard Reagent (e.g., n-BuMgCl), and further treated with a Lewis acid (e.g., $TiCl_4$). The CNM-g-polyolefin may be produced via in-situ monomer (e.g., propylene) polymerization on the graphene oxide-supported Ziegler-Natta catalyst.

The in-situ polymerization may occur at a temperature of from about 0° C. to about 300° C., at a pressure in the range of from about 0.35 MPa to about 10 MPa, and at a time up to 300 minutes.

In another nonlimiting example, the polyolefin may be grafted on the carbon nanomaterial (e.g., carbon nanotubes (CNT), single-wall carbon nanotubes (SWCNT)) by in-situ free radical functionalization. The in-situ free radical functionalization may be carried out by melt compounding in the presence of peroxide initiators (e.g., benzoyl peroxide initiators). For example, a wet polypropylene pellets/powder with SWCNT may be suspended in chloroform to create an initial dispersion between polymer and SWCNT. A peroxide (e.g., benzoyl peroxide) may be further added to functionalize the SWCNT. The solvent may be removed by solvent evaporation, under reduced pressure, prior to initiate in-situ reaction at high-temperature high shear mixing in Haake (e.g., temperature ranging from about 100° C. to about 200° C.), enabling covalent bonding of SWCNT to the polymer.

In yet another nonlimiting example, the polyolefin may be grafted on the carbon nanomaterial (e.g., graphene oxide sheets (GOS)) by amidation reaction. The amidation reaction between graphene oxide and polyolefins may include: graphene oxide sheets covalently grafted to a polyolefin (e.g., polypropylene (PP)) by producing amine-modified graphene oxide such as $NH_2$-terminated GOS via nucleophilic substitution reaction of 4,4'-methylene dianiline with GOS. PP-g-GOS through grafting maleated PP on $NH_2$-t-GOS. For example, graphene oxide comprising polyolefin (e.g., polypropylene graphene oxide sheets PP-g-GOS) may be used as compatibalizers for polyolefin-based blends via a) solvent blending b) melt compounding. The graphene oxide (GO) may be prepared from natural graphite by a chemical conversion process from the carboxyl group of GO to acyl chloride bound GO via the introduction of thionyl chloride, method also referred to as the modified Hummers method.

CNM-g-Polyolefin Particles and Methods of Making

CNM-g-polyolefins of the present disclosure may be used for producing spherical microparticles, pellets, or filaments. The spherical microparticles (or powder) comprising CNM-g-polyolefins of the present disclosure may be used in a three-dimensional (3D) printing technique by selective laser sintering (SLS), whereas the filaments or pellets comprising CNM-g-polyolefins of the present disclosure may be used in a three-dimensional (3D) printing technique by fused filament fabrication (FFF).

The methods and compositions described herein relate to highly spherical polymer particles that comprise CNM-g-polyolefin. Without being limited by theory, it is believed that having the polyolefin grafted to the CNM aids in a more homogeneous distribution of the CNM in the polymer particles, which results in a more homogeneous distribution in objects (or portions thereof) produced by additive manufacturing methods using said polymer particles.

For example, the present disclosure includes methods that comprise: mixing a mixture comprising: (a) a CNM-g-polyolefin, (b) a carrier fluid that is immiscible with the polyolefin of the CNM-g-polyolefin, optionally (c) a thermoplastic polymer (which may be the same or different than the polyolefin of the CNM-g-polyolefin) not grafted to a CNM, and optionally (d) an emulsion stabilizer at a temperature greater than a melting point or softening temperature of the polyolefin and at a shear rate sufficiently high to disperse the CNM-g-polyolefin in the carrier fluid; cooling the mixture to below the melting point or softening temperature of the polyolefin to form spherical polymer particles; and separating the spherical polymer particles from the carrier fluid.

The FIGURE is a flow chart of a nonlimiting example method 100 of the present disclosure. CNM-g-polyolefin 102, carrier fluid 104, optionally emulsion stabilizer 106, and optionally thermoplastic polymer not grafted to a CNM 108 (e.g., the polyolefin of the CNM-g-polyolefin 102, a polyolefin not of the CNM-g-polyolefin 102, another thermoplastic polymer, or any combination thereof) are combined 110 to produce a mixture 112. The components 102, 104, 106, and 108 can be added individually or in a blend of components in any order and include mixing and/or heating during the process of combining 110 the components 102, 104, 106, and 108. For example, the CNM-g-polyolefin 102 and the thermoplastic polymer not grafted to a CNM 108, if included, may be premixed before combining 110. Herein, the polyolefin of the CNM-g-polyolefin refers to the polyolefin if not grafted to a CNM.

The mixture 112 is then processed 114 by applying sufficiently high shear to the mixture 112 at a temperature greater than the melting point or softening temperature of (a) the polyolefin of the CNM-g-polyolefin 102 or (b) thermoplastic polymer not grafted to a CNM 108, whichever is greater to form a melt emulsion 116. Because the temperature is above the melting point or softening temperature of polymeric portions of the mixture 112 (i.e., the polyurethane of the CNM-g-polyolefin 102 and, if included, thermoplastic polymer not grafted to a CNM 108), a polymer melt forms that comprises the CNM-g-polyolefin 102 and, if included, thermoplastic polymer not grafted to a CNM 108. The shear rate should be sufficient enough to disperse the polymer melt (e.g., comprising the CNM-g-polyolefin) in the carrier fluid 104 as droplets (i.e., the polymer emulsion 116). Without being limited by theory, it is believed that, all other factors being the same, increasing shear should decrease the size of the droplets of the polymer melt in the carrier fluid 104. However, at some point there may be diminishing returns on increasing shear and decreasing droplet size or there may be disruptions to the droplet contents that decrease the quality of particles produced therefrom.

The melt emulsion 116 inside and/or outside the mixing vessel is then cooled 118 to solidify the polymer droplets into CNM-g-polyolefin particles 124. The term "CNM-g-polyolefin particles" refers to polymer particles comprising the CNM-g-polyolefin 102 and may include other components in the polymer particles (e.g., the thermoplastic polymer not grafted to a CNM 108).

The cooled mixture 120 can then be treated 122 to isolate the CNM-g-polyolefin particles 124 from other components 126 (e.g., the carrier fluid 104, excess emulsion stabilizer 106, and the like) and wash or otherwise purify the CNM-g-polyolefin particles 124. The CNM-g-polyolefin particles 124 comprise the CNM-g-polyolefin 102 and the thermoplastic polymer not grafted to a CNM 108, when included, and at least a portion of the emulsion stabilizer 106, when included, coating the outer surface of the CNM-g-polyolefin particles 124. Emulsion stabilizers 106, or a portion thereof, may be deposited as coating, perhaps a uniform coating, on the CNM-g-polyolefin particles 124. In some instances, which may be dependent upon non-limiting factors such as the temperature (including cooling rate), the type of CNM-g-polyolefin 102, and the types and sizes of emulsion stabilizers 106, the nanoparticles of emulsion stabilizers 106 may become at least partially embedded within the outer surface of CNM-g-polyolefin particles 124. Even without embedment taking place, at least a portion of the nanoparticles within emulsion stabilizers 106 may remain robustly associated with CNM-g-polyolefin particles 124 to facilitate their further use. In contrast, dry blending already formed polymer particulates (e.g., formed by cryogenic grinding or precipitation processes) with a flow aid like silica nanoparticles does not result in a robust, uniform coating of the flow aid upon the polymer particulates.

The CNM-g-polyolefin particles 124 may optionally be further purified 128 (described in more detail below) to yield purified CNM-g-polyolefin particles 130.

The carrier fluid should be chosen such that at the various processing temperatures (e.g., from room temperature to process temperature) the CNM-g-polyolefin and the carrier fluid are immiscible. An additional factor that may be considered is the differences in (e.g., a difference or a ratio of) viscosity at process temperature between the CNM-g-polyolefin and the carrier fluid. The differences in viscosity may affect droplet breakup and particle size distribution. Without being limited by theory, it is believed that when the viscosities of the CNM-g-polyolefin and the carrier fluid are too similar, the circularity of the product as a whole may be reduced where the particles are more ovular and more elongated structures are observed.

The CNM-g-polyolefin 102 may be present in the mixture 112 at about 5 wt % to about 60 wt % (or about 5 wt % to about 25 wt %, or about 10 wt % to about 30 wt %, or about 20 wt % to about 45 wt %, or about 25 wt % to about 50 wt %, or about 40 wt % to about 60 wt %) of the CNM-g-polyolefin 102, the thermoplastic polymers not grafted to a CNM 108, and the carrier fluid 104 combined. When the thermoplastic polymers not grafted to a CNM 108 is included, CNM-g-polyolefin 102 and the thermoplastic polymers not grafted to a CNM 108 combined may be present in the mixture 112 at about 5 wt % to about 60 wt % (or about 5 wt % to about 25 wt %, or about 10 wt % to about 30 wt %, or about 20 wt % to about 45 wt %, or about 25 wt % to about 50 wt %, or about 40 wt % to about 60 wt %) of the CNM-g-polyolefin 102, the thermoplastic polymers not grafted to a CNM 108, and the carrier fluid 104 combined. When include, the weight ratio of the CNM-g-polyolefin 102 to the thermoplastic polymers not grafted to a CNM 108 may be about 10:90 to about 99:1 (or about 10:90 to about 50:50, or about 25:75 to about 75:25, or about 50:50 to about 99:1, or about 80:20 to about 99:1).

Examples of thermoplastic polymers not grafted to a CNM 108 may include, but are not limited to, polyamides, polyurethanes, polyethylenes, polypropylenes, polyacetals, polycarbonates, polybutylene terephthalate (PBT), polyethylene terephthalate (PET), polyethylene naphthalate (PEN), polytrimethylene terephthalate (PTT), ethylene vinyl acetate copolymer (EVA), ethylene propylene diene rubber (EPDM), ethylene-propylene elastomer (EPR), poly(4-methyl-1-pentene), polyhexamethylene terephthalate, polystyrenes, polyvinyl chlorides, polytetrafluoroethenes, polyesters (e.g., polylactic acid), polyethers, polyether sulfones, polyetherether ketones, polyacrylates, polymethacrylates, polyimides, acrylonitrile butadiene styrene (ABS), polyphenylene sulfides, vinyl polymers, polyarylene ethers, polyarylene sulfides, polysulfones, polyether ketones, polyamide-imides, polyetherimides, polyetheresters, copolymers comprising a polyether block and a polyamide block (PEBA or polyether block amide), thermoplastic polyolefins, functionalized or nonfunctionalized ethylene/vinyl monomer polymer, functionalized or nonfunctionalized ethylene/alkyl (meth)acrylates, functionalized or nonfunctionalized (meth)acrylic acid polymers, functionalized or nonfunctionalized ethylene/vinyl monomer/alkyl (meth)acrylate terpolymers, ethylene/vinyl monomer/carbonyl terpolymers, ethylene/alkyl (meth)acrylate/carbonyl terpolymers, methylmethacrylate-butadiene-styrene (MBS)-type core-shell polymers, polystyrene-block-polybutadiene-block-poly(methyl methacrylate) (SBM) block terpolymers, chlorinated or chlorosulphonated polyethylenes, polyvinylidene fluoride (PVDF), phenolic resins, poly(ethylene/vinyl acetate), polybutadienes, polyisoprenes, styrenic block copolymers, polyacrylonitriles, silicones, and the like, and any combination thereof. Copolymers comprising one or more of the foregoing may also be used in the methods and systems of the present disclosure. In some cases, copolymers of PE with polar monomers, such as poly(ethylene-co-vinyl acetate), poly(ethylene-co-methyl acrylate), poly(ethylene-co-glycidyl methacrylate), and poly(ethylene-co-vinyl alcohol) may improve compatibility in polyethylene-poly(methylmethacrylate) (PE/PMMA) blends.

The thermoplastic polymers not grafted to a CNM 108 in the compositions and methods of the present disclosure may be elastomeric or non-elastomeric. Some of the foregoing examples of thermoplastic polymers may be elastomeric or non-elastomeric depending on the exact composition of the polymer. For example, polyethylene that is a copolymer of ethylene and propylene may be elastomeric or not depending on the amount of propylene in the polymer.

Thermoplastic elastomers generally fall within one of six classes: styrenic block copolymers, thermoplastic polyolefin elastomers, thermoplastic vulcanizates (also referred to as elastomeric alloys), thermoplastic polyurethanes, thermoplastic copolyesters, and thermoplastic polyamides (typically block copolymers comprising polyamide). Examples of thermoplastic elastomers can be found in Handbook of Thermoplastic Elastomers, 2nd ed., B. M. Walker and C. P. Rader, eds., Van Nostrand Reinhold, New York, 1988. Examples of thermoplastic elastomers include, but are not limited to, elastomeric polyamides, polyurethanes, copolymers comprising a polyether block and a polyamide block (PEBA or polyether block amide), methyl methacrylate-butadiene-styrene (MBS)-type core-shell polymers, polystyrene-block-polybutadiene-block-poly(methyl methacrylate) (SBM) block terpolymers, polybutadienes, polyisoprenes, styrenic block copolymers, and polyacrylonitriles), silicones, and the like. Elastomeric styrenic block copolymers may include at least one block selected from the group of: isoprene, isobutylene, butylene, ethylene/butylene, ethylene-propylene, and ethylene-ethylene/propylene. More specific elastomeric styrenic block copolymer examples include, but are not limited to, poly(styrene-ethylene/butylene), poly(styrene-ethylene/butylene-styrene), poly(styrene-ethylene/propylene), styrene-ethylene/propylene-styrene), poly(styrene-ethylene/propylene-styrene-ethylene-propylene), poly(styrene-butadiene-styrene), poly(styrene-butylene-butadiene-styrene), and the like, and any combination thereof.

The polyolefin polymer not grafted to a CNM may be selected from the group consisting of polyacrylates, polybenzimidazoles, polycarbonates, polyether sulfones, polyaryl ether ketones, polyether ether ketone, polyetherimide, polyethylenes, poly(ethylene-co-vinylacetate), polyphenylene oxides, polypropylenes, polystyrenes (e.g., poly(styrene isoprene styrene), acrylonitrile butadiene styrene (ABS), poly(Styrene Ethylene Butylene Styrene) (SEBS), styrene n-butyl acrylate), styrene-butyl acrylate, polyesters, polyurethanes, polyamides, poly(vinylidene fluoride) (PVDF), poly(vinylidene fluoride-co-hexafluoropropylene), polyethylene terephthalate, polylactic acid (PLA), polycaprolactone, poly (propoxylated bisphenol A co-fumarate), polyvinyl chlorides, ethylene vinyl acetate copolymer (EVA), ethylene propylene diene rubber (EPDM), ethylene-propylene elastomer (EPR), poly(4-methyl-1-pentene), and combinations thereof.

Examples of polyamides include, but are not limited to, polycaproamide (nylon 6, polyamide 6, or PA6), poly(hexamethylene succinamide) (nylon 4,6, polyamide 4,6, or PA4,6), polyhexamethylene adipamide (nylon 6,6, polyamide 6,6, or PA6,6), polypentamethylene adipamide (nylon 5,6, polyamide 5,6, or PA5,6), polyhexamethylene sebacamide (nylon 6,10, polyamide 6,10, or PA6,10), polyundecaamide (nylon 11, polyamide 11, or PA11), polydodecaamide (nylon 12, polyamide 12, or PA12), and polyhexamethylene terephthalamide (nylon 6T, polyamide 6T, or PA6T), nylon 10,10 (polyamide 10,10 or PA10,10), nylon 10,12 (polyamide 10,12 or PA10,12), nylon 10,14 (polyamide 10,14 or PA10,14), nylon 10,18 (polyamide 10,18 or PA10,18), nylon 6,18 (polyamide 6,18 or PA6,18), nylon 6,12 (polyamide 6,12 or PA6,12), nylon 6,14 (polyamide 6,14 or PA6,14), nylon 12,12 (polyamide 12,12 or PA12,12), and the like, and any combination thereof. Copolyamides may also be used. Examples of copolyamides include, but are not limited to, PA 11/10,10, PA 6/11, PA 6,6/6, PA 11/12, PA 10,10/10,12, PA 10,10/10,14, PA 11/10, 36, PA 11/6,36, PA 10,10/10,36, PA 6T/6,6, and the like, and any combination thereof. A polyamide followed by a first number comma second number is a polyamide having the first number of backbone carbons between the nitrogens for the section having no pendent =O and the second number of backbone carbons being between the two nitrogens for the section having the pendent =O. By way of nonlimiting example, nylon 6,10 is $[NH-(CH_2)_6-NH-CO-(CH_2)_8-CO]_n$. A polyamide followed by number(s) backslash number(s) are a copolymer of the polyamides indicated by the numbers before and after the backslash.

Examples of polyurethanes include, but are not limited to, polyether polyurethanes, polyester polyurethanes, mixed polyether and polyester polyurethanes, and the like, and any combination thereof. Examples of thermoplastic polyurethanes include, but are not limited to, poly[4,4'-methylenebis (phenylisocyanate)-alt-1,4-butanediol/di(propylene glycol)/polycaprolactone], ELASTOLLAN® 1190A (a polyether polyurethane elastomer, available from BASF), ELASTOLLAN® 1190A10 (a polyether polyurethane elastomer, available from BASF), and the like, and any combination thereof.

Compatibilizers may optionally be used to improve the blending efficiency and efficacy of the CNM-g-polyolefin with one or more thermoplastic polymers, such as non-polar polymers. Examples of polymer compatibilizers include, but not limited to, PROPOLDER™ MPP2020 20 (polypropylene, available from Polygroup Inc.), PROPOLDER™ MPP2040 40 (polypropylene, available from Polygroup Inc.), NOVACOM™ HFS2100 (maleic anhydride functionalized high density polyethylene polymer, available from Polygroup Inc.), KEN-REACT™ CAPS™ L™ 12/L (organometallic coupling agent, available from Kenrich Petrochemicals), KEN-REACT™ CAPOW™ L™ 12/H (organometallic coupling agent, available from Kenrich Petrochemicals), KEN-REACT™ LICA™ 12 (organometallic coupling agent, available from Kenrich Petrochemicals), KEN-REACT™ CAPS™ KPR™ 12/LV (organometallic coupling agent, available from Kenrich Petrochemicals), KEN-REACT™ CAPOW™ KPR™ 12/H (organometallic coupling agent, available from Kenrich Petrochemicals), KEN-REACT™ titanates & zirconates (organometallic coupling agent, available from Kenrich Petrochemicals), VISTAMAXX™ (ethylene-propylene copolymers, available from ExxonMobil), SANTOPRENE™ (thermoplastic vulcanizate of ethylene-propylene-diene rubber and polypropylene, available from ExxonMobil), VISTALON™ (ethylene-propylene-diene rubber, available from ExxonMobil), EXACT™ (plastomers, available from ExxonMobil) EXXELOR™ (polymer resin, available from ExxonMobil), FUSABOND™ M603 (random ethylene copolymer, available from Dow), FUSABOND™ E226 (anhydride modified polyethylene, available from Dow), BYNEL™ 41E710 (coextrudable adhesive resin, available from Dow), SURLYN™ 1650 (ionomer resin, available from Dow), FUSABOND™ P353 (a chemically modified polypropylene copolymer, available from Dow), ELVALOY™ PTW (ethylene terpolymer, available from Dow), ELVALOY™ 3427AC (a copolymer of ethylene and butyl acrylate, available from Dow), LOTADER™ AX8840 (ethylene acrylate-based terpolymer, available from Arkema), LOTADER™ 3210 (ethylene acrylate-based terpolymer, available from Arkema), LOTADER™ 3410 (ethylene acrylate-based terpolymer, available from Arkema), LOTADER™ 3430 (ethylene acrylate-based terpolymer, available from Arkema), LOTADER™ 4700 (ethylene acrylate-based terpolymer, available from Arkema), LOTADER™ AX8900 (ethylene acrylate-based terpolymer, available from Arkema), LOTADER™ 4720 (ethylene acrylate-based terpolymer, available from Arkema), BAXXODUR™ EC 301 (amine for epoxy, available from BASF), BAXXODUR™ EC 311 (amine for epoxy, available from BASF), BAXXODUR™ EC 303 (amine for epoxy, available from BASF), BAXXODUR™ EC 280 (amine for epoxy, available from BASF), BAXXODUR™ EC 201 (amine for epoxy, available from BASF), BAXXODUR™ EC 130 (amine for epoxy, available from BASF), BAXXODUR™ EC 110 (amine for epoxy, available from BASF), styrenics, polypropylene, polyamides, polycarbonate, EASTMAN™

G-3003 (a maleic anhydride grafted polypropylene, available from Eastman), RETAIN™ (polymer modifier available from Dow), AMPLIFY TY™ (maleic anhydride grafted polymer, available from Dow), INTUNE™ (olefin block copolymer, available from Dow), and the like and any combination thereof.

The polyolefin of the CNM-g-polyolefin 102 and/or the thermoplastic polymer not grafted to a CNM 108 may have a melting point or softening temperature of about 50° C. to about 450° C. (or about 50° C. to about 125° C., or about 100° C. to about 175° C., or about 150° C. to about 280° C., or about 200° C. to about 350° C., or about 300° C. to about 450° C.).

The polyolefin of the CNM-g-polyolefin 102 and/or the thermoplastic polymer not grafted to a CNM 108 may have a glass transition temperature (ASTM E1356-08(2014) with 10° C./min ramping and cooling rates) of about −50° C. to about 400° C. (or about −50° C. to about 0° C., or about −25° C. to about 50° C., or about 0° C. to about 150° C., or about 100° C. to about 250° C., or about 150° C. to about 300° C., or about 200° C. to about 400° C.).

The thermoplastic polymer not grafted to a CNM 108 may optionally comprise an additive. Typically, the additive would be present before addition of the thermoplastic polymers to the mixture. Therefore, in the polymer melt droplets and resultant CNM-g-polyolefin particles 124/130, the additive is dispersed throughout the thermoplastic polymer. Accordingly, for clarity, this additive is referred to herein as an "internal additive." The internal additive may be blended with the thermoplastic polymer just prior to making the mixture or well in advance.

When describing component amounts in the compositions described herein (e.g., the mixture and the CNM-g-polyolefin particles), a weight percent based on the thermoplastic polymer not inclusive of the internal additive. For example, a composition comprising 1 wt % of emulsion stabilizer by weight of 100 g of a thermoplastic polymer comprising 10 wt % internal additive and 90 wt % thermoplastic polymer is a composition comprising 0.9 g of emulsion stabilizer, 90 g of thermoplastic polymer, and 10 g of internal additive.

The internal additive may be present in the thermoplastic polymer at about 0.1 wt % to about 60 wt % (or about 0.1 wt % to about 5 wt %, or about 1 wt % to about 10 wt %, or about 5 wt % to about 20 wt %, or about 10 wt % to about 30 wt %, or about 25 wt % to about 50 wt %, or about 40 wt % to about 60 wt %) of the thermoplastic polymer not grafted to a CNM 108. For example, the thermoplastic polymer may comprise about 70 wt % to about 85 wt % of a thermoplastic polymer and about 15 wt % to about 30 wt % of an internal additive like glass fiber or carbon fiber.

Examples of internal additives include, but are not limited to, fillers, strengtheners, pigments, pH regulators, and the like, and combinations thereof. Examples of fillers include, but are not limited to, glass fibers, glass particles, mineral fibers, carbon fiber, oxide particles (e.g., titanium dioxide and zirconium dioxide), metal particles (e.g., aluminum powder), and the like, and any combination thereof. Examples of pigments include, but are not limited to, organic pigments, inorganic pigments, carbon black, and the like, and any combination thereof. For example, fillers used herein may include exfoliated graphite (EG), exfoliated graphite nanoplatelets (xGnP), carbon black, carbon nanofibers (CNF), carbon nanotubes (CNT), graphenes, graphene oxides, graphite oxides, graphene oxide nanosheets, fullerenes.

Suitable carrier fluids may have a viscosity at 25° C. of about 1,000 cSt to about 150,000 cSt (or about 1,000 cSt to about 60,000 cSt, or about 40,000 cSt to about 100,000 cSt, or about 75,000 cSt to about 150,000 cSt). For example, suitable carrier fluids may have a viscosity at 25° C. of about 10,000 cSt to about 60,000 cSt.

Examples of carrier fluids may include, but are not limited to, silicone oil, fluorinated silicone oils, perfluorinated silicone oils, polyethylene glycols, alkyl-terminal polyethylene glycols (e.g., C1-C4 terminal alkyl groups like tetraethylene glycol dimethyl ether (TDG)), paraffins, liquid petroleum jelly, vison oils, turtle oils, soya bean oils, perhydrosqualene, sweet almond oils, calophyllum oils, palm oils, parleam oils, grapeseed oils, sesame oils, maize oils, rapeseed oils, sunflower oils, cottonseed oils, apricot oils, castor oils, avocado oils, jojoba oils, olive oils, cereal germ oils, esters of lanolic acid, esters of oleic acid, esters of lauric acid, esters of stearic acid, fatty esters, higher fatty acids, fatty alcohols, polysiloxanes modified with fatty acids, polysiloxanes modified with fatty alcohols, polysiloxanes modified with polyoxy alkylenes, and the like, and any combination thereof. Examples of silicone oils include, but are not limited to, polydimethylsiloxane (PDMS), methylphenylpolysiloxane, an alkyl modified polydimethylsiloxane, an alkyl modified methylphenylpolysiloxane, an amino modified polydimethylsiloxane, an amino modified methylphenylpolysiloxane, a fluorine modified polydimethylsiloxane, a fluorine modified methylphenylpolysiloxane, a polyether modified polydimethylsiloxane, a polyether modified methylphenylpolysiloxane, and the like, and any combination thereof. When the carrier fluid comprises two or more of the foregoing, the carrier fluid may have one or more phases. For example, polysiloxanes modified with fatty acids and polysiloxanes modified with fatty alcohols (preferably with similar chain lengths for the fatty acids and fatty alcohols) may form a single-phase carrier fluid. In another example, a carrier fluid comprising a silicone oil and an alkyl-terminal polyethylene glycol may form a two-phase carrier fluid. In at least one embodiment, the carrier fluid is polydimethylsiloxane (PDMS).

The carrier fluid may be present in the mixture at about 40 wt % to about 95 wt % (or about 75 wt % to about 95 wt %, or about 70 wt % to about 90 wt %, or about 55 wt % to about 80 wt %, or about 50 wt % to about 75 wt %, or about 40 wt % to about 60 wt %) of the CNM-g-polyolefin 102, the thermoplastic polymers not grafted to a CNM 108, and the carrier fluid 104 combined.

In some instances, the carrier fluid may have a density of about 0.6 g/cm$^3$ to about 1.5 g/cm$^3$, and the thermoplastic polymer may have a density of about 0.7 g/cm$^3$ to about 1.7 g/cm$^3$, wherein the thermoplastic polymer may have a density similar, lower, or higher than the density of the carrier fluid.

The carbon nanomaterial should be sufficiently stable to not decompose at the processing temperatures. Examples of carbon nanomaterial may include, but are not limited to, carbon nanotubes, graphites, graphenes, fullerenes, carbon black; and the like; and any combination thereof.

The emulsion stabilizers used in the methods and compositions of the present disclosure may comprise nanoparticles (e.g. oxide nanoparticles, carbon black, polymer nanoparticles, and combinations thereof), surfactants, and the like, and any combination thereof.

Oxide nanoparticles may be metal oxide nanoparticles, non-metal oxide nanoparticles, or mixtures thereof. Examples of oxide nanoparticles include, but are not limited to, silica, titania, zirconia, alumina, iron oxide, copper oxide, tin oxide, boron oxide, cerium oxide, thallium oxide, tungsten oxide, and the like, and any combination thereof. Mixed metal oxides and/or non-metal oxides, like aluminosilicates, borosilicates, and aluminoborosilicates, are also inclusive in the term metal oxide. The oxide nanoparticles may by hydrophilic or hydrophobic, which may be native to the particle or a result of surface treatment of the particle. For example, a silica nanoparticle having a hydrophobic surface treatment, like dimethyl silyl, trimethyl silyl, and the like, may be used in methods and compositions of the present disclosure. Additionally, silica with functional surface treatments like methacrylate functionalities may be used in methods and compositions of the present disclosure. Unfunctionalized oxide nanoparticles may also be suitable for use as well.

Commercially available examples of silica nanoparticles include, but are not limited to, AEROSIL® particles available from Evonik (e.g., AEROSIL® R812S (about 7 nm average diameter silica nanoparticles having a hydrophobically modified surface and a BET surface area of 260±30 $m^2/g$), AEROSIL® RX50 (about 40 nm average diameter silica nanoparticles having a hydrophobically modified surface and a BET surface area of 35±10 $m^2/g$), AEROSIL® 380 (silica nanoparticles having a hydrophilically modified surface and a BET surface area of 380±30 $m^2/g$), and the like, and any combination thereof.

Carbon black is another type of nanoparticle that may be present as an emulsion stabilizer in the compositions and methods disclosed herein. Various grades of carbon black will be familiar to one having ordinary skill in the art, any of which may be used herein. Other nanoparticles capable of absorbing infrared radiation may be used similarly.

Polymer nanoparticles are another type of nanoparticle that may be present as an emulsion stabilizer in the disclosure herein. Suitable polymer nanoparticles may include one or more polymers that are thermosetting and/or crosslinked, such that they do not melt when processed by melt emulsification according to the disclosure herein. High molecular weight thermoplastic polymers having high melting or decomposition points may similarly comprise suitable polymer nanoparticle emulsion stabilizers.

Surfactants may be anionic, cationic, nonionic, or zwitterionic. Examples of surfactants include, but are not limited to, sodium dodecyl sulfate, sorbitan oleates, poly[dimethylsiloxane-co-[3-(2-(2-hydroxyethoxy)ethoxy)propylmethylsiloxane]], docusate sodium (sodium 1,4-bis(2-ethylhexoxy)-1,4-dioxobutane-2-sulfonate), and the like, and any combination thereof. Commercially available examples of surfactants include, but are not limited to, CALFAX® DB-45 (sodium dodecyl diphenyl oxide disulfonate, available from Pilot Chemicals), SPAN® 80 (sorbitan maleate non-ionic surfactant), MERPOL® surfactants (available from Stepan Company), TERGITOL™ TMN-6 (a water-soluble, nonionic surfactant, available from DOW), TRITON™ X-100 (octyl phenol ethoxylate, available from SigmaAldrich), IGEPAL® CA-520 (polyoxyethylene (5) isooctylphenyl ether, available from SigmaAldrich), BRIJ® S10 (polyethylene glycol octadecyl ether, available from SigmaAldrich), and the like, and any combination thereof.

Surfactants may be included in the mixture at a concentration of about 0.01 wt % to about 10 wt % (or about 0.01 wt % to about 1 wt %, or about 0.5 wt % to about 2 wt %, or about 1 wt % to about 3 wt %, or about 2 wt % to about 5 wt %, or about 5 wt % to about 10 wt %) based on the weight of the CNM-g-polyolefin 102. Alternatively, the mixture may comprise no (or be absent of) surfactant.

A weight ratio of nanoparticles to surfactant in the emulsion stabilizer 106 may be about 1:10 to about 10:1 (or about 1:10 to about 1:1, or about 1:5 to about 5:1, or about 1:1 to about 10:1).

The emulsion stabilizer 106 may be included in the mixture at a concentration of about 0.01 wt % to about 10 wt % (or about 0.01 wt % to about 1 wt %, or about 0.1 wt % to about 3 wt %, or about 1 wt % to about 5 wt %, or about 5 wt % to about 10 wt %) based on the weight of the CNM-g-polyolefin 102 and the thermoplastic polymers not grafted to a CNM 108 combined.

Relative to the combining 110 of the FIGURE, in some instances, the emulsion stabilizer may first be dispersed in the carrier fluid, optionally with heating said dispersion, before adding the CNM-g-polyolefin 102 and/or the thermoplastic polymers not grafted to a CNM 108. In another nonlimiting example, the CNM-g-polyolefin 102 and/or the thermoplastic polymers not grafted to a CNM 108 may be heated to produce a polymer melt to which the carrier fluid and emulsion stabilizer are added together or in either order. In yet another nonlimiting example, the CNM-g-polyolefin 102 and/or the thermoplastic polymers not grafted to a CNM 108 along with carrier fluid can be mixed at a temperature greater than the necessary melting point or softening temperature described herein and at a shear rate sufficient enough to disperse the polymer melt in the carrier fluid. Then, the emulsion stabilizer can be added to form the mixture and maintained at suitable process conditions for a set period of time.

Combining the CNM-g-polyolefin 102, the thermoplastic polymers not grafted to a CNM 108, the carrier fluid, and optionally the emulsion stabilizer in any combination can occur in a mixing apparatus used for the processing and/or another suitable vessel. By way of nonlimiting example, the CNM-g-polyolefin 102 and/or the thermoplastic polymers not grafted to a CNM 108 may be heated to a temperature greater than the necessary melting point or softening temperature described herein in the mixing apparatus used for the processing, and the emulsion stabilizer may be dispersed in the carrier fluid in another vessel. Then, said dispersion may be added to the melt in the mixing apparatus used for the processing.

The mixing apparatuses used for the processing to produce the melt emulsion should be capable of maintaining the melt emulsion at a temperature greater than the necessary melting point or softening temperature described herein and applying a shear rate sufficient to disperse the polymer melt in the carrier fluid as droplets.

Examples of mixing apparatuses used for the processing to produce the melt emulsion may include, but are not limited to, extruders (e.g., continuous extruders, batch extruders, and the like), stirred reactors, blenders, reactors with inline homogenizer systems, and the like, and apparatuses derived therefrom.

The processing and forming the melt emulsion at suitable process conditions (e.g., temperature, shear rate, and the like) for a set period of time.

The temperature of the processing and forming the melt emulsion should be a temperature greater than the necessary melting point or softening temperature of the described herein and less than the decomposition temperature of any components (i.e., the CNM-g-polyolefin 102, the thermoplastic polymers not grafted to a CNM 108, carrier fluid, emulsion stabilizer) in the mixture. For example, the temperature of processing and forming the melt emulsion may be about 1° C. to about 50° C. (or about 1° C. to about 25° C., or about 5° C. to about 30° C., or about 20° C. to about 50° C.) greater than the melting point or softening temperature described herein provided the temperature of processing and forming the melt emulsion is less than the decomposition temperature of any components (i.e., the CNM-g-polyolefin 102, the thermoplastic polymers not grafted to a CNM 108, carrier fluid, emulsion stabilizer) in the mixture.

The shear rate of processing and forming the melt emulsion should be sufficiently high to disperse the polymer melt in the carrier fluid as droplets. Said droplets should comprise droplets having a diameter of about 1000 µm or less (or about 1 µm to about 1000 µm, or about 1 µm to about 50 µm, or about 10 µm to about 100 µm, or about 10 µm to about 250 µm, or about 50 µm to about 500 µm, or about 250 µm to about 750 µm, or about 500 µm to about 1000 µm).

The time for maintaining said temperature and shear rate for processing and forming the melt emulsion may be 10 seconds to 18 hours or longer (or 10 seconds to 30 minutes, or 5 minutes to 1 hour, or 15 minutes to 2 hours, or 1 hour to 6 hours, or 3 hours to 18 hours). Without being limited by theory, it is believed that a steady state of droplet sizes will be reached at which point processing can be stopped. That time may depend on, among other things, the temperature, shear rate, the CNM-g-polyolefin 102, the thermoplastic polymers not grafted to a CNM 108, the carrier fluid composition, and the emulsion stabilizer composition.

The melt emulsion may then be cooled. Cooling can be slow (e.g., allowing the melt emulsion to cool under ambient conditions) to fast (e.g., quenching). For example, the rate of cooling may range from about 10° C./hour to about 100° C./second to almost instantaneous with quenching (for example in dry ice) (or about 10° C./hour to about 60° C./hour, or about 0.5° C./minute to about 20° C./minute, or about 1° C./minute to about 5° C./minute, or about 10° C./minute to about 60° C./minute, or about 0.5° C./second to about 10° C./second, or about 10° C./second to about 100° C./second).

During cooling, little to no shear may be applied to the melt emulsion. In some instances, the shear applied during heating may be applied during cooling.

The cooled mixture resulting from cooling the melt emulsion may comprise solidified CNM-g-polyolefin particles and other components (e.g., the carrier fluid, excess emulsion stabilizer, and the like). The solidified CNM-g-polyolefin particles may be dispersed in the carrier fluid and/or settled in the carrier fluid.

The cooled mixture may then be treated to the separate CNM-g-polyolefin particles from the other components. Suitable treatments include, but are not limited to, washing, filtering, centrifuging, decanting, and the like, and any combination thereof.

Solvents used for washing the CNM-g-polyolefin particles should generally be (a) miscible with the carrier fluid and (b) nonreactive (e.g., non-swelling and non-dissolving) with the CNM-g-polyolefin 102 and/or the thermoplastic polymers not grafted to a CNM 108. The choice of solvent will depend on, among other things, the compositions of the carrier fluid, the CNM-g-polyolefin 102, and the thermoplastic polymers not grafted to a CNM 108.

Examples of solvents include, but are not limited to, hydrocarbon solvents (e.g., pentane, hexane, heptane, octane, cyclohexane, cyclopentane, decane, dodecane, tridecane, and tetradecane), aromatic hydrocarbon solvents (e.g., benzene, toluene, xylene, 2-methyl naphthalene, and cresol), ether solvents (e.g., diethyl ether, tetrahydrofuran, diisopropyl ether, and dioxane), ketone solvents (e.g., acetone and methyl ethyl ketone), alcohol solvents (e.g., methanol, ethanol, isopropanol, and n-propanol), ester solvents (e.g., ethyl acetate, methyl acetate, butyl acetate, butyl propionate, and butyl butyrate), halogenated solvents (e.g., chloroform, bromoform, 1,2-dichloromethane, 1,2-dichloroethane, carbon tetrachloride, chlorobenzene, and hexafluoroisopropanol), water, and the like, and any combination thereof.

Solvent may be removed from the CNM-g-polyolefin particles by drying using an appropriate method such as air-drying, heat-drying, reduced pressure drying, freeze drying, or a hybrid thereof. The heating may be performed preferably at a temperature lower than the glass transition point of the polyolefin of CNM-g-polyolefin 102 and the thermoplastic polymers not grafted to a CNM 108, when included, (e.g., about 50° C. to about 150° C.).

Advantageously, carrier fluids and washing solvents of the systems and methods described herein can be recycled and reused. One skilled in the art will recognize any necessary cleaning of used carrier fluid and solvent necessary in the recycling process.

The CNM-g-polyolefin particles, after separation from the other components, may optionally be further purified. For example, to narrow the particle size distribution (or reduce the diameter span), the CNM-g-polyolefin particles can be passed through a sieve having a pore size of about 10 µm to about 250 µm (or about 10 µm to about 100 µm, or about 50 µm to about 200 µm, or about 150 µm to about 250 µm).

In another example purification technique, the CNM-g-polyolefin particles may be washed with water to remove surfactant while maintaining substantially all of the nanoparticles associated with the surface of the CNM-g-polyolefin particles. In yet another example purification technique, the CNM-g-polyolefin particles may be blended with additives to achieve a desired final product. For clarity, because such additives are blended with the CNM-g-polyolefin particles described herein after the particles are solidified, such additives are referred to herein as "external additives." Examples of external additives include flow aids, other polymer particles, fillers, and the like, and any combination thereof.

In some instances, a surfactant used in making the CNM-g-polyolefin particles may be unwanted in downstream applications. Accordingly, yet another example purification technique may include at least substantial removal of the surfactant from the CNM-g-polyolefin particles (e.g., by washing and/or pyrolysis).

The CNM-g-polyolefin particles and/or purified CNM-g-polyolefin particles may be characterized by composition, physical structure, and the like.

As described above, the emulsion stabilizers are at the interface between the polymer melt and the carrier fluid. As a result, when the mixture is cooled, the emulsion stabilizers remain at, or in the vicinity of, said interface. Therefore, the structure of the CNM-g-polyolefin particles is, in general when emulsion stabilizers are used, includes emulsion stabilizers (a) dispersed on an outer surface of the CNM-g-polyolefin particles and/or (b) embedded in an outer portion (e.g., outer 1 vol %) of the CNM-g-polyolefin particles.

Further, where voids form inside the polymer melt droplets, emulsion stabilizers should generally be at (and/or embedded in) the interface between the interior of the void and the CNM-g-polyolefin and/or thermoplastic polymer. The voids generally do not contain the CNM-g-polyolefin and/or thermoplastic polymer. Rather, the voids may contain, for example, carrier fluid, air, or be void. The CNM-g-polyolefin particles may comprise carrier fluid at about 5 wt % or less (or about 0.001 wt % to about 5 wt %, or about 0.001 wt % to about 0.1 wt %, or about 0.01 wt % to about 0.5 wt %, or about 0.1 wt % to about 2 wt %, or about 1 wt % to about 5 wt %) of the CNM-g-polyolefin particles.

When the thermoplastic polymers not grafted to a CNM is not included, the CNM-g-polyolefin and the thermoplastic polymers not grafted to a CNM, combined, may be present in the CNM-g-polyolefin particles at about 90 wt % to about 99.5 wt % (or about 90 wt % to about 95 wt %, or about 92 wt % to about 97 wt %, or about 95 wt % to about 99.5 wt %) of the CNM-g-polyolefin particles. When the thermoplastic polymers not grafted to a CNM is included, the CNM-g-polyolefin and the thermoplastic polymers not grafted to a CNM, combined, may be present in the CNM-g-polyolefin particles at about 90 wt % to about 99.5 wt % (or about 90 wt % to about 95 wt %, or about 92 wt % to about 97 wt %, or about 95 wt % to about 99.5 wt %) of the CNM-g-polyolefin particles. The weight ratio of the CNM-g-polyolefin to the thermoplastic polymers not grafted to a CNM, when included, may be about 10:90 to about 99:1 (or about 10:90 to about 50:50, or about 25:75 to about 75:25, or about 50:50 to about 99:1, or about 80:20 to about 99:1).

When included, the emulsion stabilizers may be present in the CNM-g-polyolefin particles at about 10 wt % or less (or about 0.01 wt % to about 10 wt %, or about 0.01 wt % to about 1 wt %, or about 0.5 wt % to about 5 wt %, or about 3 wt % to about 7 wt %, or about 5 wt % to about 10 wt %) of the CNM-g-polyolefin particles. When purified to at least substantially remove surfactant or another emulsion stabilizer, the emulsion stabilizers may be present in the CNM-g-polyolefin particle 124/130 at less than 0.01 wt % (or 0 wt % to about 0.01 wt %, or 0 wt % to 0.001 wt %).

Upon forming thermoplastic particulates according to the disclosure herein using particulate emulsion stabilizers, at least a portion of the particulate emulsion stabilizers, such as silica nanoparticles, may be disposed as a coating upon the outer surface of the CNM-g-polyolefin particle 124/130. At least a portion of the surfactant, if used, may be associated with the outer surface as well. The coating may be disposed substantially uniformly upon the outer surface. As used herein with respect to a coating, the term "substantially uniform" refers to even coating thickness in surface locations covered by the coating composition (e.g., nanoparticles and/or surfactant), particularly the entirety of the outer surface. The emulsion stabilizers 106 may form a coating that covers at least 5% (or about 5% to about 100%, or about 5% to about 25%, or about 20% to about 50%, or about 40% to about 70%, or about 50% to about 80%, or about 60% to about 90%, or about 70% to about 100%) of the surface area of the CNM-g-polyolefin particles. When purified to at least substantially remove surfactant or another emulsion stabilizer, the emulsion stabilizers may be present in the CNM-g-polyolefin particles 124/130 at less than 25% (or 0% to about 25%, or about 0.10% to about 5%, or about 0.10% to about 10%, or about 10% to about 5%, or about 1% to about 10%, or about 5% to about 15%, or about 10% to about 25%) of the surface area of the CNM-g-polyolefin particles 124/130. The coverage of the emulsion stabilizers on an outer surface of the CNM-g-polyolefin particles may be determined using image analysis of the scanning electron microscope images (SEM micrographs). The emulsion stabilizers may form a coating that covers at least 5% (or about 5% to about 100%, or about 5% to about 25%, or about 20% to about 50%, or about 40% to about 70%, or about 50% to about 80%, or about 60% to about 90%, or about 70% to about 100%) of the surface area of the CNM-g-polyolefin particles (and coated CNM-g-polyolefin particles, when produced). When purified to at least substantially remove surfactant or another emulsion stabilizer, the emulsion stabilizers may be present in the CNM-g-polyolefin particles 124/130 at less than 25% (or 0% to about 25%, or about 0.1% to about 5%, or about 0.1% to about 1%, or about 1% to about 5%, or about 1% to about 10%, or about 5% to about 15%, or about 10% to about 25%) of the surface area of the CNM-g-polyolefin particles 124/130. The coverage of the emulsion stabilizers on an outer surface of the CNM-g-polyolefin particles may be determined using image analysis of the SEM micrographs.

The CNM-g-polyolefin particles 124/130 of the present disclosure may include the carbon nanomaterial (or cumulative carbon nanomaterials if more than one is used) at about 0.01 wt % to about 50 wt % (or about 0.01 wt % to about 1 wt %, or about 0.1 wt % to about 5 wt %, or about 1 wt % to about 10 wt %, or about 5 wt % to about 20 wt %, or about 10 wt % to about 30 wt %, or about 25 wt % to about 50 wt %) of the CNM-g-polyolefin particles 124/130.

The CNM-g-polyolefin particles 124/130 may comprise one or more carbon nanomaterial. For example, two or more different carbon nanomaterials may be grafted to a polyolefin in the same reaction and then used as CNM-g-polyolefin in the methods and compositions described herein. In another example, two different CNM-g-polyolefins may be produced and blended before (or during) the mixing process of the melt-emulsification process described herein.

The CNM-g-polyolefin particles 124/130 may have a circularity of about 0.90 to about 1.0.

The CNM-g-polyolefin particles 124/130 may have a BET surface area of about 10 m$^2$/g to about 500 m$^2$/g (or about 10 m$^2$/g to about 150 m$^2$/g, or about 25 m$^2$/g to about 100 m$^2$/g, or about 100 m$^2$/g to about 250 m$^2$/g, or about 250 m$^2$/g to about 500 m$^2$/g).

The CNM-g-polyolefin particles may have a D10 of about 0.1 μm to about 125 μm (or about 0.1 μm to about 5 μm, about 1 μm to about 10 μm, about 5 μm to about 30 μm, or about 1 μm to about 25 μm, or about 25 μm to about 75 μm, or about 50 μm to about 85 μm, or about 75 μm to about 125 μm), a D50 of about 0.5 μm to about 200 μm (or about 0.5 μm to about 10 μm, or about 5 μm to about 50 μm, or about 30 μm to about 100 μm, or about 30 μm to about 70 μm, or about 25 μm to about 50 μm, or about 50 μm to about 100 μm, or about 75 μm to about 150 μm, or about 100 μm to about 200 μm), and a D90 of about 3 μm to about 300 μm (or about 3 μm to about 15 μm, or about 10 μm to about 50 μm, or about 25 μm to about 75 μm, or about 70 μm to about 200 μm, or about 60 μm to about 150 μm, or about 150 μm to about 300 μm), wherein D10<D50<D90. The CNM-g-polyolefin particles may also have a diameter span of about 0.2 to about 10 (or about 0.2 to about 0.5, or about 0.4 to about 0.8, or about 0.5 to about 1, or about 1 to about 3, or about 2 to about 5, or about 5 to about 10). Without limitation, diameter span values of 1.0 or greater are considered broad, and diameter spans values of 0.75 or less are considered narrow. Preferable, the CNM-g-polyolefin particles have a diameter span of about 0.2 to about 1.

In a first nonlimiting example, the CNM-g-polyolefin particles may have a D10 of about 0.1 μm to about 10 μm, a D50 of about 0.5 μm to about 25 μm, and a D90 of about 3 μm to about 50 μm, wherein D10<D50<D90. Said CNM-g-polyolefin particles may have a diameter span of about 0.2 to about 2.

In a second nonlimiting example, the CNM-g-polyolefin particles may have a D10 of about 5 μm to about 30 μm, a D50 of about 30 μm to about 70 μm, and a D90 of about 70

μm to about 120 μm, wherein D10<D50<D90. Said CNM-g-polyolefin particles may have a diameter span of about 1.0 to about 2.5.

In a third nonlimiting example, the CNM-g-polyolefin particles may have a D10 of about 25 μm to about 60 μm, a D50 of about 60 μm to about 110 μm, and a D90 of about 110 μm to about 175 μm, wherein D10<D50<D90. Said CNM-g-polyolefin particles may have a diameter span of about 0.6 to about 1.5.

In a fourth nonlimiting example, the CNM-g-polyolefin particles may have a D10 of about 75 μm to about 125 μm, a D50 of about 100 μm to about 200 μm, and a D90 of about 125 μm to about 300 μm, wherein D10<D50<D90. Said CNM-g-polyolefin particles may have a diameter span of about 0.2 to about 1.2.

In a fifth nonlimiting example, the CNM-g-polyolefin particles may have a D10 of about 1 μm to about 50 μm (or about 5 μm to about 30 μm, or about 1 μm to about 25 μm, or about 25 μm to about 50 μm), a D50 of about 25 μm to about 100 μm (or about 30 μm to about 100 μm, or about 30 μm to about 70 μm, or about 25 μm to about 50 μm, or about 50 μm to about 100 μm), and a D90 of about 60 μm to about 300 μm (or about 70 μm to about 200 μm, or about 60 μm to about 150 μm, or about 150 μm to about 300 μm), wherein D10<D50<D90. The CNM-g-polyolefin particles may also have a diameter span of about 0.4 to about 3 (or about 0.6 to about 2, or about 0.4 to about 1.5, or about 1 to about 3).

The CNM-g-polyolefin particles may have a circularity of about 0.9 or greater (or about 0.90 to about 1.0, or about 0.93 to about 0.99, or about 0.95 to about 0.99, or about 0.97 to about 0.99, or about 0.98 to 1.0).

The CNM-g-polyolefin particles may have an angle of repose of about 250 to about 450 (or about 250 to about 35°, or about 30° to about 40°, or about 350 to about 45°).

The CNM-g-polyolefin particles may have a Hausner ratio of about 1.0 to about 1.5 (or about 1.0 to about 1.2, or about 1.1 to about 1.3, or about 1.2 to about 1.35, or about 1.3 to about 1.5).

The CNM-g-polyolefin particles may have a bulk density of about 0.3 g/cm$^3$ to about 0.8 g/cm$^3$ (or about 0.3 g/cm$^3$ to about 0.6 g/cm$^3$, or about 0.4 g/cm$^3$ to about 0.7 g/cm$^3$, or about 0.5 g/cm$^3$ to about 0.6 g/cm$^3$, or about 0.5 g/cm$^3$ to about 0.8 g/cm$^3$).

The CNM-g-polyolefin particles may have an aerated density of about 0.5 g/cm$^3$ to about 0.8 g/cm$^3$ (or about 0.5 g/cm$^3$ to about 0.7 g/cm$^3$, or about 0.55 g/cm$^3$ to about 0.80 g/cm$^3$).

The CNM-g-polyolefin particles may have a tapped density of about 0.6 g/cm$^3$ to about 0.9 g/cm$^3$ (or about 0.60 g/cm$^3$ to about 0.75 g/cm$^3$, or about 0.65 g/cm$^3$ to about 0.80 g/cm$^3$, or about 0.70 g/cm$^3$ to about 0.90 g/cm$^3$).

Depending on the temperature and shear rate of processing and the composition and relative concentrations of the components (e.g., the CNM-g-polyolefin, the thermoplastic polymer, the carrier fluid, excess emulsion stabilizer, and the like) different shapes of the structures that compose the CNM-g-polyolefin particles may be produced. Typically, the CNM-g-polyolefin particles comprise substantially spherical particles (having a circularity of about 0.97 or greater). However, other structures including disc and elongated structures may be observed in the CNM-g-polyolefin particles. Therefore, the CNM-g-polyolefin particles may comprise one or more of: (a) substantially spherical particles having a circularity of 0.97 or greater, (b) disc structures having an aspect ratio of about 2 to about 10, and (c) elongated structures having an aspect ratio of 10 or greater. Each of the (a), (b), and (c) structures have emulsion stabilizers dispersed on an outer surface of the (a), (b), and (c) structures and/or embedded in an outer portion of the (a), (b), and (c) structures. At least some of the (a), (b), and (c) structures may be agglomerated. For example, the (c) elongated structures may be laying on the surface of the (a) substantially spherical particles. The CNM-g-polyolefin particles may have a sintering window that is within 10° C., preferably within 5° C., of the sintering window of the polyolefin of the CNM-g-polyolefin.

Applications of Polymer Particles

The present disclosure also relates to methods of selective laser sintering where the method may comprise: depositing (a) highly spherical polymer particles comprising (a1) CNM-g-polyolefin and optionally (a2) a thermoplastic polymer that is not the polyolefin of the CNM-g-polyolefin and is not grafted to a CNM and optionally (b) other thermoplastic polymer particles not comprising the CNM-g-polyolefin onto a surface; and once deposited, exposing at least a portion of the spherical polymer particles to a laser to fuse the polymer particles and form a consolidated body.

The CNM-g-polyolefin particles described herein may be used to produce a variety of articles. By way of nonlimiting example, 3-D printing processes of the present disclosure may comprise: depositing CNM-g-polyolefin particles described herein upon a surface (e.g., in layers and/or in a specified shape), and once deposited, heating at least a portion of the particles to promote consolidation thereof and form a consolidated body (or object). The consolidated body may have a void percentage of about 5% or less (e.g., 0% to about 5%, or about 0.5% to about 2%, or about 1% to about 3%, or about 2% to about 5%) after being consolidated. For example, heating and consolidation of the polymer particles (e.g., CNM-g-polyolefin particles 124/130 and other thermoplastic polymer particles) may take place in a 3-D printing apparatus employing a laser, such that heating and consolidation take place by selective laser sintering.

Examples of articles that may be produced by such methods where the CNM-g-polyolefin particles may be used to form all or a portion of said articles include, but are not limited to, particles, films, packaging, toys, household goods, automotive parts, aerospace/aircraft-related parts, containers (e.g., for food, beverages, cosmetics, personal care compositions, medicine, and the like), shoe soles, furniture parts, decorative home goods, plastic gears, screws, nuts, bolts, cable ties, jewelry, art, sculpture, medical items, prosthetics, orthopedic implants, production of artifacts that aid learning in education, 3D anatomy models to aid in surgeries, robotics, biomedical devices (orthotics), home appliances, dentistry, electronics, sporting goods, and the like. Further, particles may be useful in applications that include, but are not limited to, paints, powder coatings, ink jet materials, electrophotographic toners, 3D printing, and the like.

EXAMPLE EMBODIMENTS

A first nonlimiting example embodiment is a method of selective laser sintering comprising: depositing carbon nanomaterial-graft-polyolefin (CNM-g-polyolefin) particles optionally in combination with other thermoplastic polymer particles onto a surface, wherein the CNM-g-polyolefin particles comprise: a polyolefin grafted to a carbon nanomaterial; and once deposited, exposing at least a portion of the CNM-g-polyolefin particles to a laser to fuse the polymer particles thereof and form a consolidated body by selective laser sintering. The first nonlimiting example embodiment may include one or more of: Element 1:

wherein the CNM-g-polyolefin comprises 50 wt % to 99.95 wt % of the polyolefin, and about 0.05 wt % to about 50 wt % of the carbon nanomaterial, based on the total weight of the CNM-g-polyolefin; Element 2: Element 1 and wherein the polyolefin is a homopolymer or a copolymer forming a coating around the carbon nanomaterial by contacting one or more olefins on the surfaces of the carbon nanomaterial; Element 3: wherein the polyolefin is grafted on surfaces of the carbon nanomaterial by in-situ polymerization; Element 4: Element 3 and wherein the in-situ polymerization is carried out by pre-treating the carbon nanomaterial, wherein pre-treating comprises: contacting a catalyst, and optionally a cocatalyst, on the surfaces of the carbon nanomaterial, and wherein the catalyst is a heterogeneous catalyst, a homogeneous metallocene catalyst, or a homogeneous non-metallocene catalyst; Element 5: Element 4 and wherein the in-situ polymerization is a polymerization filling technique (PFT); Element 6: Element 4 and wherein the catalyst is a metallocene catalyst; Element 7: Element 4 and wherein the cocatalyst comprises aluminoxane; Element 8: Element 7 and wherein the aluminoxane is present at a molar ratio of aluminum to catalyst compound transition metal of 100:1 or more; Element 9: Element 3 and wherein the in-situ polymerization occurs at a temperature of from about 0° C. to about 300° C., at a pressure in the range of from about 0.35 MPa to about 10 MPa, and at a time up to 300 minutes; Element 10: wherein the polyolefin is grafted on the carbon nanomaterial by in-situ free radical functionalization that comprises melt compounding in the presence of peroxide initiators; Element 11: wherein the polyolefin is grafted on the carbon nanomaterial by amidation reaction; Element 12: Element 11 and wherein the amidation reaction occurs between graphene oxide and polyolefins; Element 13: wherein the CNM-g-polyolefin particles have a circularity of about 0.90 to about 1.0; Element 14: wherein the CNM-g-polyolefin particles have an emulsion stabilizer embedded with an outer surface of the CNM-g-polyolefin particles; Element 15: Element 14 and wherein the emulsion stabilizer comprises nanoparticles; Element 16: Element 15 and wherein at least some of the CNM-g-polyolefin particles have a void comprising the emulsion stabilizer at a void/polymer interface; Element 17: Element 15 and wherein the emulsion stabilizer comprises nanoparticles and the nanoparticles are embedded in the void/polymer interface; Element 18: wherein CNM-g-polyolefin particles further comprise: a thermoplastic polymer not grafted to a CNM; Element 19: wherein the thermoplastic polymer is selected from the group consisting of polyacrylates, polybenzimidazoles, polycarbonates, polyether sulfones, polyaryl ether ketones, polyether ether ketone, polyetherimide, polyethylenes, poly(ethylene-co-vinylacetate), polyphenylene oxides, polypropylenes, polystyrenes, styrene-butyl acrylate, polyesters, polyurethanes, polyamides, poly(vinylidene fluoride) (PVDF), polyethylene terephthalate, polylactic acid (PLA), polycaprolactone, poly (propoxylated bisphenol A co-fumarate), polyvinyl chlorides, ethylene vinyl acetate copolymer (EVA), ethylene propylene diene rubber (EPDM), ethylene-propylene elastomer (EPR), poly(4-methyl-1-pentene), and combinations thereof; Element 20: wherein CNM-g-polyolefin particles have a D10 of about 0.1 µm to about 125 µm, a D50 of about 0.5 µm to about 200 µm, and a D90 of about 3 µm to about 300 µm, and wherein D10<D50<D90; Element 21: wherein CNM-g-polyolefin particles have a diameter span of about 0.2 to about 10; Element 22: wherein CNM-g-polyolefin particles have an angle of repose of about 250 to about 45°; and Element 23: wherein CNM-g-polyolefin particles a Hausner ratio of about 1.0 to about 1.5.

Examples of combinations include, but are not limited to, Element 1 (optionally in combination with Element 2) in combination with one or more of Elements 3-23; Element 3 in combination with one or more of Elements 4-23; Element 4 in combination with one or more of Elements 5-23; Element 5 in combination with one or more of Elements 6-23; Element 6 in combination with one or more of Elements 7-23; Element 7 in combination with one or more of Elements 8-23; Element 8 in combination with one or more of Elements 9-23; Element 9 in combination with one or more of Elements 10-23; Element 10 in combination with one or more of Elements 11-23; Element 11 in combination with one or more of Elements 12-23; Element 12 in combination with one or more of Elements 13-23; Element 13 in combination with one or more of Elements 14-23; Element 14 in combination with one or more of Elements 15-23; Element 15 in combination with one or more of Elements 16-23; Element 16 in combination with one or more of Elements 17-23; Element 18 in combination with one or more of Elements 19-23; two or more of Elements 20-23 in combination; and two or more of Element 1 (optionally in combination with Element 2), Element 3, Element 4, and Element 5 in combination (optionally in combination with Element 6).

A second nonlimiting example embodiment is a composition comprising: CNM-g-polyolefin particles comprising a polyolefin grafted to a carbon nanomaterial. The CNM-g-polyolefin particles may include the CNM at about 0.05 wt % to about 50 wt % of the CNM-g-polyolefin particles, and the CNM may be selected from the group consisting of a carbon nanotube, a graphite, a graphene, a fullerene, and any combinations thereof. The second nonlimiting example embodiment may include one or more of: Element 1; Element 2; Element 3; Element 5; Element 6; Element 9; Element 10; Element 10; Element 11; Element 12; Element 13; Element 14; Element 15; Element 16; Element 17; Element 18; Element 19; Element 20; Element 21; Element 22; and Element 23, including in any of the combinations per the first nonlimiting example embodiment.

A third nonlimiting example embodiment is a method comprising: mixing a mixture comprising: (a) carbon nanomaterial-graft-polyolefin (CNM-g-polyolefin), wherein the CNM-g-polyolefin particles comprises: a polyolefin grafted to a carbon nanomaterial, (b) a carrier fluid that is immiscible with the polyolefin of the CNM-g-polyolefin, optionally (c) a thermoplastic polymer not grafted to a CNM, and optionally (d) an emulsion stabilizer at a temperature greater than a melting point or softening temperature of the polyolefin of the CNM-g-polyolefin and the thermoplastic polymer, when included, and at a shear rate sufficiently high to disperse the CNM-g-polyolefin in the carrier fluid; cooling the mixture to below the melting point or softening temperature to form CNM-g-polyolefin particles; and separating the CNM-g-polyolefin particles from the carrier fluid. The third nonlimiting example embodiment may include one or more of: Element 1; Element 2; Element 3; Element 5; Element 6; Element 9; Element 10; Element 10; Element 11; Element 12; Element 13; Element 14; Element 15; Element 16; Element 17; Element 18; Element 19; Element 20; Element 21; Element 22; and Element 23, including in any of the combinations per the first nonlimiting example embodiment.

Clauses

Clause 1. A method of selective laser sintering, the method comprising: depositing carbon nanomaterial-graftpolyolefin (CNM-g-polyolefin) particles optionally in combination with other thermoplastic polymer particles onto a surface, wherein the CNM-g-polyolefin particles comprise: a polyolefin grafted to a carbon nanomaterial; and once deposited, exposing at least a portion of the CNM-g-polyolefin particles to a laser to fuse the polymer particles thereof and form a consolidated body by selective laser sintering.

Clause 2. The method of Clause 1, wherein the CNM-g-polyolefin comprises 50 wt % to 99.95 wt % of the polyolefin, and about 0.05 wt % to about 50 wt % of the carbon nanomaterial, based on the total weight of the CNM-g-polyolefin.

Clause 3. The method of Clause 1, wherein the polyolefin is a homopolymer or a copolymer forming a coating around the carbon nanomaterial by contacting one or more olefins on the surfaces of the carbon nanomaterial.

Clause 4. The method of Clause 1, wherein the polyolefin is grafted on surfaces of the carbon nanomaterial by in-situ polymerization.

Clause 5. The method of Clause 4, wherein the in-situ polymerization is carried out by pre-treating the carbon nanomaterial, wherein pre-treating comprises: contacting a catalyst, and optionally a cocatalyst, on the surfaces of the carbon nanomaterial, and wherein the catalyst is a heterogeneous catalyst, a homogeneous metallocene catalyst, or a homogeneous non-metallocene catalyst.

Clause 6. The method of Clause 5, wherein the in-situ polymerization is a polymerization filling technique (PFT).

Clause 7. The method of Clause 5, wherein the catalyst is a metallocene catalyst.

Clause 8. The method of Clause 5, wherein the cocatalyst comprises aluminoxane.

Clause 9. The method of Clause 8, wherein the aluminoxane is present at a molar ratio of aluminum to catalyst compound transition metal of 100:1 or more.

Clause 10. The method of Clause 4, wherein the in-situ polymerization occurs at a temperature of from about 0° C. to about 300° C., at a pressure in the range of from about 0.35 MPa to about 10 MPa, and at a time up to 300 minutes.

Clause 11. The method of Clause 1, wherein the polyolefin is grafted on the carbon nanomaterial by in-situ free radical functionalization that comprises melt compounding in the presence of peroxide initiators.

Clause 12. The method of Clause 1, wherein the polyolefin is grafted on the carbon nanomaterial by amidation reaction.

Clause 13. The method of Clause 12, wherein the amidation reaction occurs between graphene oxide and polyolefins.

Clause 14. The method of Clause 1, wherein the CNM-g-polyolefin particles have a circularity of about 0.90 to about 1.0.

Clause 15. The method of Clause 1, wherein the CNM-g-polyolefin particles have an emulsion stabilizer embedded with an outer surface of the CNM-g-polyolefin particles.

Clause 16. The method of Clause 15, wherein the emulsion stabilizer comprises nanoparticles.

Clause 17. The method of Clause 16, wherein at least some of the CNM-g-polyolefin particles have a void comprising the emulsion stabilizer at a void/polymer interface.

Clause 18. The method of Clause 17, wherein the emulsion stabilizer comprises nanoparticles and the nanoparticles are embedded in the void/polymer interface.

Clause 19. The method of Clause 1, wherein CNM-g-polyolefin particles further comprise: a thermoplastic polymer not grafted to a CNM.

Clause 20. The method of Clause 19, wherein the thermoplastic polymer is selected from the group consisting of polyacrylates, polybenzimidazoles, polycarbonates, polyether sulfones, polyaryl ether ketones, polyether ether ketone, polyetherimide, polyethylenes, poly(ethylene-co-vinylacetate), polyphenylene oxides, polypropylenes, polystyrenes, styrene-butyl acrylate, polyesters, polyurethanes, polyamides, poly(vinylidene fluoride) (PVDF), polyethylene terephthalate, polylactic acid (PLA), polycaprolactone, poly (propoxylated bisphenol A co-fumarate), polyvinyl chlorides, ethylene vinyl acetate copolymer (EVA), ethylene propylene diene rubber (EPDM), ethylene-propylene elastomer (EPR), poly(4-methyl-1-pentene), and combinations thereof.

Clause 21. The method of Clause 1, wherein CNM-g-polyolefin particles further comprise: a thermoplastic polymer not grafted to a CNM.

Clause 22. The method of Clause 1, wherein CNM-g-polyolefin particles have a D10 of about 0.1 µm to about 125 µm, a D50 of about 0.5 µm to about 200 µm, and a D90 of about 3 µm to about 300 µm, and wherein D10<D50<D90.

Clause 23. The method of Clause 1, wherein CNM-g-polyolefin particles have a diameter span of about 0.2 to about 10.

Clause 24. The method of Clause 1, wherein CNM-g-polyolefin particles have an angle of repose of about 250 to about 45°.

Clause 25. The method of Clause 1, wherein CNM-g-polyolefin particles a Hausner ratio of about 1.0 to about 1.5.

Clause 26. A composition comprising: CNM-g-polyolefin particles comprising a polyolefin grafted to a carbon nanomaterial. The CNM-g-polyolefin particles may include the CNM at about 0.05 wt % to about 50 wt % of the CNM-g-polyolefin particles, and the CNM may be selected from the group consisting of a carbon nanotube, a graphite, a graphene, a fullerene, and any combinations thereof.

Clause 27. The composition of Clause 26, wherein CNM-g-polyolefin particles further comprise: a thermoplastic polymer not grafted to a CNM.

Clause 28. The composition of Clause 26, wherein CNM-g-polyolefin particles have a D10 of about 0.1 µm to about 125 µm, a D50 of about 0.5 µm to about 200 µm, and a D90 of about 3 µm to about 300 µm, and wherein D10<D50<D90.

Clause 29. The composition of Clause 26, wherein CNM-g-polyolefin particles have a diameter span of about 0.2 to about 10.

Clause 30. The composition of Clause 26, wherein CNM-g-polyolefin particles have an angle of repose of about 250 to about 45°.

Clause 31. The composition of Clause 26, wherein CNM-g-polyolefin particles a Hausner ratio of about 1.0 to about 1.5.

Clause 32. The composition of Clause 26, wherein the CNM-g-polyolefin particles have a circularity of about 0.90 to about 1.0.

Clause 33. The composition of Clause 26, wherein the CNM-g-polyolefin particles have an emulsion stabilizer embedded with an outer surface of the CNM-g-polyolefin particles.

Clause 34. The composition of Clause 33, wherein the emulsion stabilizer comprises nanoparticles.

Clause 35. A method comprising: mixing a mixture comprising: (a) carbon nanomaterial-graft-polyolefin (CNM-g-polyolefin), wherein the CNM-g-polyolefin particles comprises: a polyolefin grafted to a carbon nanomaterial, (b) a carrier fluid that is immiscible with the polyolefin of the CNM-g-polyolefin, optionally (c) a thermoplastic polymer not grafted to a CNM, and optionally (d) an emulsion stabilizer at a temperature greater than a melting point or softening temperature of the polyolefin of the CNM-g-polyolefin and the thermoplastic polymer, when included, and at a shear rate sufficiently high to disperse the CNM-g-polyolefin in the carrier fluid; cooling the mixture to below the melting point or softening temperature to form CNM-g-polyolefin particles; and separating the CNM-g-polyolefin particles from the carrier fluid.

Clause 36. The method of Clause 35, wherein the CNM-g-polyolefin comprises 50 wt % to 99.95 wt % of the polyolefin, and about 0.05 wt % to about 50 wt % of the carbon nanomaterial, based on the total weight of the CNM-g-polyolefin.

Clause 37. The method of Clause 35, wherein the carrier fluid is present at a weight ratio of the carrier fluid to a combination of the CNM-g-polyolefin and the thermoplastic polymer ranging from 50:50 to 90:10.

Clause 38. The method of Clause 35, wherein the carrier fluid is polydimethylsiloxane (PDMS).

Clause 39. The method of Clause 35, wherein the thermoplastic polymer is selected from the group consisting of polyacrylates, polybenzimidazoles, polycarbonates, polyether sulfones, polyaryl ether ketones, polyether ether ketone, polyetherimide, polyethylenes, poly(ethylene-co-vinylacetate), polyphenylene oxides, polypropylenes, polystyrenes, styrene-butyl acrylate, polyesters, polyurethanes, polyamides, poly(vinylidene fluoride) (PVDF), polyethylene terephthalate, polylactic acid (PLA), polycaprolactone, poly (propoxylated bisphenol A co-fumarate), polyvinyl chlorides, ethylene vinyl acetate copolymer (EVA), ethylene propylene diene rubber (EPDM), ethylene-propylene elastomer (EPR), poly(4-methyl-1-pentene), and combinations thereof.

Clause 40. The method of Clause 35, wherein the polyolefin is a homopolymer or a copolymer forming a coating around the carbon nanomaterial by contacting one or more olefins on the surfaces of the carbon nanomaterial.

Clause 41. The method of Clause 35, wherein the polyolefin is grafted on surfaces of the carbon nanomaterial by in-situ polymerization, in-situ free radical functionalization, or amidation reaction.

Unless otherwise indicated, all numbers expressing quantities of ingredients, properties such as molecular weight, process conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the present disclosure embodiments disclosed herein are presented herein. Not all features of a physical implementation are described or shown in this application for the sake of clarity. It is understood that in the development of a physical embodiment incorporating the embodiments of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present disclosure, the following examples of preferred or representative embodiments are given. In no way should the following examples be read to limit, or to define, the scope of the present disclosure.

EXAMPLES

Example 1. Unfilled polyolefin powder: Unfilled polyolefin powder was prepared by melt extrusion in the following manner. The extruder was brought to a temperature around the melting point of the polymer and the rotors were started at a slow speed. Polymer pellets were added to the heated extruder followed by the carrier fluid. PDMS oil was used as carrier fluid, with a viscosity ranging from 10,000 cSt to 60,000 cSt at room temperature. The ratio of PDMS oil to polymer was 70:30 (or 30% polymer pellets in 70% PDMS oil). An optional dispersing agent or flow aid may be added prior to the carrier fluid to aid with the flow of the dried particles. The extruder was operated at 200 rpm (maximum speed) for 30 minutes, at 225° C. The mixture was then discharged onto a metal tray with dry ice to provide rapid quench cooling. Once the dry ice had sublimated, the PDMS oil was washed away from the microparticles with three heptane washes, and the microparticles were isolated by vacuum filtration. The microparticles were then dried overnight in a vacuum oven at room temperature to allow any residual heptane to evaporate. The dried particles were then sieved through a 150 µm or 250 µm screen. The resulting sieved powder was obtained with a final average particle size (D50) of approximately 50 microns and a span of approximately 1.

Example 2 (Prophetic). Polyolefin powder melt mixed with CNT filler. CNM-g-polyolefin may be prepared by melt processing (e.g., melt extrusion). The extruder may be brought to a temperature around the melting point of the polymer and the rotors may be started. At a low speed, polyolefin resin pellets may be fed into the chamber. CNT may then be added to melt compound into the resin. PDMS oil may be used as carrier fluid, with a viscosity ranging from 10,000 cSt to 60,000 cSt at room temperature. The ratio of PDMS oil to polymer may be 70:30. At temperature, the extruder may be operated at 200 rpm (maximum speed) for 30 minutes at 225° C. The mixture may then be discharged onto a metal tray with dry ice to provide rapid quench cooling. Once the dry ice has sublimated, the oil may be washed away from the microparticles with three heptane washes and the microparticles may be isolated by vacuum filtration. The microparticles may then be dried overnight in a vacuum oven at room temperature to allow any residual heptane to evaporate. The dried particles may then be sieved through a 150 µm or 250 µm screen.

Example 3 (Prophetic). Polymerization of Polyolefin onto CNT: Pretreatment of Carbon Nanotubes with the Cocatalyst: The crude nanotubes may be placed into a polymerization flask and flame-dried under high vacuum. The flask may then be filled with nitrogen, and may be placed in an oil bath at 50° C. Then, dried and deoxygenated n-heptane and MAO may be added under nitrogen. The CNTs, in contact with the aluminoxane, may be stirred for 1 hour at 50° C. Solvents may then be distilled off at 50° C. under reduced pressure. The solvents, together with any volatile organoaluminum compounds, may be trapped in a flask cooled by liquid nitrogen for aluminum titration. Treated CNTs may further be heated up at 150° C. under reduced pressure for 90 minutes to bind the MAO to the carbon nanotubes, thus producing the aluminoxane-treated CNTs.

Polymerization of Polyolefin onto CNT: Homopolymerization of Ethylene (or Propylene) in the Presence of Carbon Nanotubes Pretreated with the Cocatalyst: The aluminoxane-treated CNTs may be dispersed in dried n-heptane. Then, $Cp*_2ZrCl_2$ may be added to the suspension. The stirred mixture may then be heated up to 50° C. for 15 minutes. The reactor may be purged by ethylene (0.5 minute) in order to remove nitrogen. The polymerization reaction may be carried out under a constant pressure of 13 bar of ethylene at 50° C. and vigorous stirring for a defined period of time. The final material may be precipitated in methanol acidified with 12M hydrochloric acid and filtered off. This step may allowed for both recovering the HDPE coated nanotubes and deactivating the catalytic complex yielding residual aluminum oxide ($Al_2O_3$) in all samples. The resulting material may be dried at 60° C. for approximately 12 hours in a ventilated oven.

Preparation of CNT-Polyolefin Microparticles-Melt Extrusion: Microparticles may be produced from the CNM-g-polyolefin Sample 1 by melt extrusion in a HAAKE™ RHEOMIX twin screw extruder with high shear rotors. The extruder may be brought to a temperature around the melting point of the polymer and the rotors may be started at a slow speed. The polymer pellets of Sample 1 may be added to the heated extruder followed by the carrier fluid. PDMS oil may be used as carrier fluid, with a viscosity ranging from 10,000 cSt to 60,000 cSt at room temperature. The ratio of PDMS oil to polymer may be 70:30. An optional dispersing agent or flow aid may be added prior to the carrier fluid to aid with the flow of the dried particles. At temperature, the extruder may be operated at 200 rpm (maximum speed) for 30 minutes. The mixture may then be discharged onto a metal tray with dry ice to provide rapid quench cooling. Once the dry ice has sublimated, the oil may be washed away from the microparticles with three heptane washes and the microparticles may be isolated by vacuum filtration. The microparticles may be dried overnight in a vacuum oven at room temperature to allow any residual heptane to evaporate. The dried particles may then be sieved through a 150 μm or 250 μm screen.

SLS Printing and Mechanical Testing: The baseline performance of the dried powders may be determined by sintering the samples. The samples may be 3D printed on a SNOWWHITE SLS printer (available from Sharebot). The laser may selectively fuse the sample by scanning cross-sections of the desired object generated using a computer-aided design (CAD) model. After the first layer comprising the sample is scanned, the powder bed may be lowered, and another portion of the sample may be rolled on top, and the subsequent layer may be scanned until the part is completed. Advantageously, when compared to current additive manufacturing techniques, the use of such powder-based system may enable the elimination of printing supports and the ability to reuse the materials.

The mechanical properties of Example 1, Example 2, and Example 3 may be determined by printing ASTM Tensile D638, Type V Dogbone bars on the SNOWWHITE SLS printer. It is expected that the mechanical properties of CNM-g-polyolefin may be greater than the mechanical properties of unfilled polyolefin. Further, the polyolefins grafted with CNTs may have superior mechanical properties to polyolefins which are simply melt mixed with CNTs (i.e., not grafted). Without being bond by any theory or mechanism, it is believed that SLS printing would not change the intrinsic mechanical properties of the materials, hence the CNM-g-polyolefin particle should yield SLS printed objects with improved mechanical properties over polyolefin microparticles not compounded with CNTs or microparticles of mixed (not grafted) polyolefin and CNTs.

Example 4 (Prophetic). Metallocene Catalysis via Polymerization Filling Technique (PFT): Pretreatment of the Carbon Nanotubes with the Cocatalyst. Twenty-six grams of multi-walled carbon nanotubes (MWNTs) may be dried overnight at 100° C. under vacuum and may be added under nitrogen to 2.6 L of dried and deoxygenated n-heptane and 221 mL of MAO (deprived of its trimethylaluminum (TMA) by distillation). The TMA may be recovered, and may be kept for titration (fraction 1). The system may then be stirred for 1 hour at 40° C. Solvents may be distilled off at 40° C. under reduced pressure. The solvents together with any volatile organoaluminum compounds may be trapped in a flask cooled down by liquid nitrogen (fraction 2). Treated CNTs may be heated to 150° C. under reduced pressure for 90 minutes. The MAO excess may be removed by washing thrice with dried toluene (3×70 ml) at 60° C. (fraction 3). Fractions 1, 2 and 3 may be hydrolyzed by addition of 150 ml aqueous HCl (ca. 2M) and extracted. Aluminum may be back-titrated by EDTA, for assessing the amount of MAO fixed on the CNTs. Aluminum concentration may then be evaluated by titration with EDTA as the mean of three aliquots. The organics solvents may be evaporated by heating the solution to ebullition under magnetic agitation. 5 ml of the acidic solution may be diluted 20-fold, and then 20 ml of a solution of 0.025 M EDTA may be added. The solution may be heated to ebullition, and may then be cooled to room temperature. The solution may be buffered at pH=4.76 with sodium acetate. The excess of EDTA may be determined by titration with a solution of $ZnSO_4$ (0.05 M) with xylenol orange as indicator. The as-determined concentration of the aluminum complex may be used to calculate the amount of aluminum that may be evacuated during the solvent evaporation and the CNTs washing process.

Homopolymerization of Ethylene in the Presence of Carbon Nanotubes Pretreated with the Cocatalyst: The treated CNTs (approximately 26 g) may be dispersed in 2.6 L dried n-heptane and may then be transferred into 250 ml glass-reactor in a glove-box. Then, 57.2 ml of $Cp_2*ZrCl_2$ (molar concentration of $5.2 \cdot 10^{-3}$ M) may be added to the suspension. The stirred mixture may be heated up to 50° C. for 15 minutes. The reactor may be purged by ethylene (0.5 min) in order to remove nitrogen. The synthesis may be carried out under a constant pressure of 2.7 bars of ethylene at 50° C. and vigorous stirring for 1 hour. The final material may be precipitated in 15.6 L methanol acidified with hydrochloric acid, and may be dried at 70° C. for about 7 hours under reduced pressure.

Preparation of Carbon Nanotube-Polyethylene (CNT-PE) Microparticles: The microparticles may be produced from the CNM-g-polyolefin prepared above by melt extrusion in a HAAKE™ RHEOMIX twin screw extruder with high shear rotors. The extruder may be brought to a temperature around the melting point of the polymer (225° C.) and the rotors may be started at 120 rpm. 65 g of the MWNT-g-PE polymer (prepared above) may be added to the heated extruder followed by 152 g carrier fluid. The carrier fluid may be polydimethylsiloxane (PDMS) oil having a viscosity ranging from 10,000 cSt to 60,000 cSt at room temperature. The ratio of PDMS oil to polymer may be 70:30 (or 30% polymer solids in 70% oil). Using approximately 20 g of the measured PDMS, a slurry may be made by mixing the PDMS with 0.325 g RX50 (0.5 wt % of MWNT-g-PE polymer) fumed silica. The resulting slurry may then be added into the extruder. At temperature, the extruder may be operated at 120 rpm for 10 minutes. The mixture may then be discharged onto a metal tray with dry ice to provide rapid quench cooling. Once the dry ice is sublimated, the oil may be washed away from the microparticles with three heptane washes and the microparticles may be isolated by vacuum filtration. The microparticles may then be dried overnight in a vacuum oven at room temperature to allow any residual heptane to evaporate. The dried particles may be sieved through a 150 μm or 250 μm screen. The resulting powder may have a final average particle size (D50) of approximately 50 microns and a span of approximately 1.

Example 5 (Prophetic). Synthesis of graphene oxide-supported Ziegler-Natta catalyst: A Grignard reagent, $C_4H_9MgCl$ (BuMgCl) may be prepared by reacting chlorobutane (10 mL) and magnesium powder (14.2 g) in tetrahydrofuran (250 mL) at refluxing temperature (80° C.) under $N_2$ atmosphere for 20 hours. Then, 0.1 mol of BuMgCl/tetrahydrofuran solution may be added dropwise into 4 L of tetrahydrofuran suspension containing 4.06 g graphene oxide (GO). After 48 hours of reaction at refluxing temperature (80° C.), the excess Grignard reagent may be filtered off, and the solid may be washed in turn with tetrahydrofuran and hexane three times. The powdery product may then be dried under vacuum at 60° C. for 12 hours, which may result in 6.08 g BuMgCl/GO. Five grams of BuMgCl/GO may then be added into 250 mL titanium tetrachloride ($TiCl_4$) at room temperature, after which the temperature may be brought up to 120° C., and the mixture may be stirred for 4 hours. Then the reactant may be filtered to remove the unreacted $TiCl_4$ and a second 150 mL volume of $TiCl_4$ may be charged into the reactor. The reaction may be completed after stirring for 4 hours at 120° C. The reaction mixture may then be filtered, washed with hot hexane (e.g., washed six times), and dried under vacuum at 60° C. for 12 hours, to produce about 4.57 g GO-supported Ziegler-Natta catalyst, $TiCl_4$/(BuMgCl/GO).

In-situ Polypropylene Polymerization: The polymerization reaction may be carried out with a PARR stainless steel autoclave reactor equipped with a mechanical stirrer. 500 mL of hexane may be added into the reactor, which may then be filled with propylene under a constant pressure of 0.5 MPa. The reactor may be heated at 60° C., and the powdery catalyst $TiCl_4$/(BuMgCl/GO) (0.193 g) may be added into the vigorously stirred liquid mixture saturated with propylene. The polymerization reaction may be initiated by charging $AlEt_3$ (3.04 mL, 1.08 mmol) and dimethyoxydiphenylsilane (0.108 mmol) into the reactor using syringe. After 30 min, the polymerization may be quenched by 105 mL of acidified ethanol (containing 10% HCl). The polymer product may be collected by filtration, and repeatedly washed with ethanol and distilled water. After it is dried under vacuum at 60° C. for 24 hours, 65 g of polymer product may be obtained as a gray powder (polypropylene/graphene oxide (PP/GO)).

Preparation of Polypropylene-Graphene Oxide Microparticles: Microparticles may be produced from the PP-g-GO prepared above by melt extrusion in a HAAKE™ RHEOMIX twin screw extruder with high shear rotors. The extruder may be brought to a temperature around the melting point of the polymer (225° C.) and the rotors may be started at 120 rpm. 65 g of the PP-g-GO (prepared above) may be added to the heated extruder followed by 152 g carrier fluid. The carrier fluid may be polydimethylsiloxane (PDMS) oil having a viscosity ranging from 10,000 cSt to 60,000 cSt at room temperature. The ratio of PDMS oil to polymer may be 70:30 (or 30% polymer solids in 70% oil). Using approximately 20 g of the measured PDMS, a slurry may be made by mixing the PDMS with 0.325 g AEROSIL® RX50 (0.5 wt % of PP-g-GO) fumed silica. The resulting slurry may then be added into the extruder. At temperature, the extruder may be operated at 120 rpm for 10 minutes. The mixture may then be discharged onto a metal tray with dry ice to provide rapid quench cooling. Once the dry ice has sublimated, the oil may be washed away from the microparticles with three heptane washes and the microparticles may then be isolated by vacuum filtration. The microparticles may then be dried overnight in a vacuum oven at room temperature to allow any residual heptane to evaporate. The dried particles may then be sieved through a 150 μm or 250 μm screen. The resulting powder may have a final average particle size (D50) of approximately 50 microns and a span of approximately 1.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The present disclosure illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:
1. A method of selective laser sintering, comprising:
providing carbon nanomaterial-graft-polyolefin (CNM-g-polyolefin) particles, optionally in combination with other thermoplastic polymer particles; wherein the CNM-g-polyolefin particles comprise a polyolefin grafted to a carbon nanomaterial;
depositing the CNM-g-polyolefin particles onto a surface; and once deposited, exposing at least a portion of the CNM-g-polyolefin particles to a laser to fuse the particles and form a consolidated body by selective laser sintering.

2. The method of claim 1, wherein the CNM-g-polyolefin comprises 50 wt % to 99.95 wt % of the polyolefin, and about 0.05 wt % to about 50 wt % of the carbon nanomaterial, based on a total weight of the CNM-g-polyolefin.

3. The method of claim 1, wherein the polyolefin is a homopolymer or a copolymer forming a coating around the carbon nanomaterial.

4. The method of claim 1, wherein the polyolefin is grafted on a surface of the carbon nanomaterial by in-situ polymerization.

5. The method of claim 4, wherein the in-situ polymerization is carried out by pre-treating the carbon nanomaterial, wherein pre-treating comprises:
contacting a catalyst, and optionally a cocatalyst, on the surface of the carbon nanomaterial, and wherein the catalyst is a heterogeneous catalyst, a homogeneous metallocene catalyst, or a homogeneous non-metallocene catalyst.

6. The method of claim 1, wherein the polyolefin is grafted on the carbon nanomaterial by in-situ free radical functionalization that comprises melt compounding in the presence of peroxide initiators.

7. The method of claim 1, wherein the polyolefin is grafted on the carbon nanomaterial by an amidation reaction.

8. The method of claim 7, wherein the amidation reaction occurs between graphene oxide and polyolefins.

9. The method of claim 1, wherein the CNM-g-polyolefin particles have a circularity of about 0.90 to about 1.0.

10. The method of claim 1, wherein the CNM-g-polyolefin particles have an emulsion stabilizer embedded within an outer surface of the CNM-g-polyolefin particles.

11. The method of claim 10, wherein the emulsion stabilizer comprises nanoparticles.

12. The method of claim 10, wherein the emulsion stabilizer comprises nanoparticles and the nanoparticles are embedded in a void/polymer interface.

13. The method of claim 1, wherein CNM-g-polyolefin particles further comprise a thermoplastic polymer not grafted to a carbon nanomaterial.

14. The method of claim 1, wherein CNM-g-polyolefin particles have a D10 of about 0.1 μm to about 125 μm, a D50 of about 0.5 μm to about 200 μm, and a D90 of about 3 μm to about 300 μm, and wherein D10<D50<D90.

15. The method of claim 1, wherein CNM-g-polyolefin particles have a diameter span of about 0.2 to about 10.

16. The method of claim 1, wherein CNM-g-polyolefin particles have an angle of repose of about 25° to about 45°.

17. The method of claim 1, wherein CNM-g-polyolefin particles have a Hausner ratio of about 1.0 to about 1.5.

* * * * *